(12) United States Patent
Sinha et al.

(10) Patent No.: US 9,654,842 B2
(45) Date of Patent: *May 16, 2017

(54) METHOD AND SYSTEM FOR CONTEXTUAL ADVERTISEMENT REPLACEMENT UTILIZING AUTOMATIC CONTENT RECOGNITION

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,565

(22) Filed: Mar. 8, 2016

(65) Prior Publication Data

US 2016/0192032 A1 Jun. 30, 2016

Related U.S. Application Data

(63) Continuation of application No. 13/730,530, filed on Dec. 28, 2012, now Pat. No. 9,351,037.
(Continued)

(51) Int. Cl.
*H04N 7/16* (2011.01)
*H04N 21/81* (2011.01)
(Continued)

(52) U.S. Cl.
CPC ......... *H04N 21/812* (2013.01); *G06F 3/0484* (2013.01); *G06F 17/30495* (2013.01);
(Continued)

(58) Field of Classification Search
CPC .. H04N 21/812; H04N 21/4622; H04N 7/173; H04N 21/8352; H04N 21/6582;
(Continued)

(56) References Cited

U.S. PATENT DOCUMENTS 7,134,132 B1 11/2006 Ngo et al.
7,730,509 B2 6/2010 Boulet et al.
(Continued)

*Primary Examiner* — Pankaj Kumar
*Assistant Examiner* — Reuben M Brown
(74) *Attorney, Agent, or Firm* — Chip Law Group

(57) ABSTRACT

An automatic content recognition (ACR)-enabled connected TV device may be operable to identify, utilizing ACR, viewer interaction and/or viewer information. The ACR-enabled connected TV device may present, utilizing the ACR, a variant of an advertisement in a next ad pod during presentation of content, based on the identified viewer interaction and/or the identified viewer information. The viewer information may comprise customized preferences profile, default preferences setting, viewing habits, time of day and/or location. The viewer information may also comprise objects and/or events captured by an associated camera. When an identified stored episode of a show is presented via DVR playback, the ACR-enabled connected TV device may present, in a next ad pod, a new version of an advertisement, where the new version of the advertisement may be associated with a new episode of the show and presentation of the new version may result in a C3 rating credit.

20 Claims, 12 Drawing Sheets

1. In Live Presentation of an Episode of a Show

2. In DVR Playback of the Episode of the Show after C3 Rating Time Window

US 9,654,842 B2
Page 2

Related U.S. Application Data

(60) Provisional application No. 61/596,012, filed on Feb. 7, 2012.

(51) Int. Cl.

| | |
|---|---|
| *G06T 1/00* | (2006.01) |
| *G06F 17/30* | (2006.01) |
| *G06F 3/0484* | (2013.01) |
| *H04N 21/442* | (2011.01) |
| *H04N 21/4784* | (2011.01) |
| *H04N 21/44* | (2011.01) |
| *H04N 21/4722* | (2011.01) |
| *H04N 21/478* | (2011.01) |
| *H04N 21/441* | (2011.01) |
| *H04N 21/435* | (2011.01) |
| *H04N 21/00* | (2011.01) |
| *H04N 21/432* | (2011.01) |
| *H04N 21/25* | (2011.01) |
| *H04N 21/258* | (2011.01) |
| *H04N 21/4147* | (2011.01) |
| *H04N 21/4223* | (2011.01) |
| *H04N 21/45* | (2011.01) |
| *H04N 21/466* | (2011.01) |
| *H04N 5/445* | (2011.01) |

(52) U.S. Cl.
CPC .......... *G06T 1/0021* (2013.01); *H04N 21/00* (2013.01); *H04N 21/251* (2013.01); *H04N 21/25866* (2013.01); *H04N 21/4147* (2013.01); *H04N 21/4223* (2013.01); *H04N 21/432* (2013.01); *H04N 21/435* (2013.01); *H04N 21/441* (2013.01); *H04N 21/442* (2013.01); *H04N 21/44008* (2013.01); *H04N 21/4532* (2013.01); *H04N 21/4667* (2013.01); *H04N 21/478* (2013.01); *H04N 21/4722* (2013.01); *H04N 21/4784* (2013.01)

(58) Field of Classification Search
CPC ....... H04N 21/44222; H04N 21/25891; H04N 21/435; H04N 21/8358; H04N 21/84; H04N 21/235; H04N 21/26603; H04N 21/23418; H04N 21/2407; H04N 21/4828; G06T 1/0021; G06F 17/30784; H04H 60/33; H04H 60/61
USPC ........................................ 725/19, 20, 34, 35
See application file for complete search history.

(56) References Cited

U.S. PATENT DOCUMENTS

| | | | |
|---|---|---|---|
| 8,572,640 B2 | 10/2013 | Kolessar | |
| 8,671,457 B2 * | 3/2014 | Juneau | H04L 67/18 380/247 |
| 8,738,442 B1 | 5/2014 | Liu et al. | |
| 8,810,512 B2 | 8/2014 | Andersson et al. | |
| 9,351,037 B2 * | 5/2016 | Sinha | G06T 1/0021 |
| 2003/0172381 A1 | 9/2003 | Janevski | |
| 2004/0003397 A1 | 1/2004 | Boston et al. | |
| 2004/0158858 A1 | 8/2004 | Paxton et al. | |
| 2005/0097599 A1 | 5/2005 | Plotnick et al. | |
| 2009/0150930 A1 | 6/2009 | Sherwin et al. | |
| 2009/0235317 A1 | 9/2009 | Igarashi | |
| 2011/0314495 A1 * | 12/2011 | Zenor | G06Q 30/02 725/34 |
| 2012/0096491 A1 | 4/2012 | Shkedi | |
| 2012/0180083 A1 | 7/2012 | Marcus | |
| 2012/0185895 A1 * | 7/2012 | Wong | H04N 21/26258 725/32 |
| 2013/0064524 A1 * | 3/2013 | Griffin | H04N 21/2407 386/262 |
| 2013/0191860 A1 * | 7/2013 | Kitazato | H04N 21/4622 725/32 |
| 2013/0205315 A1 | 8/2013 | Sinha et al. | |
| 2013/0339250 A1 | 12/2013 | Katzin et al. | |
| 2014/0173661 A1 | 6/2014 | Yamagishi | |
| 2014/0250450 A1 | 9/2014 | Yu et al. | |
| 2016/0192032 A1 * | 6/2016 | Sinha | G06T 1/0021 725/12 |

* cited by examiner

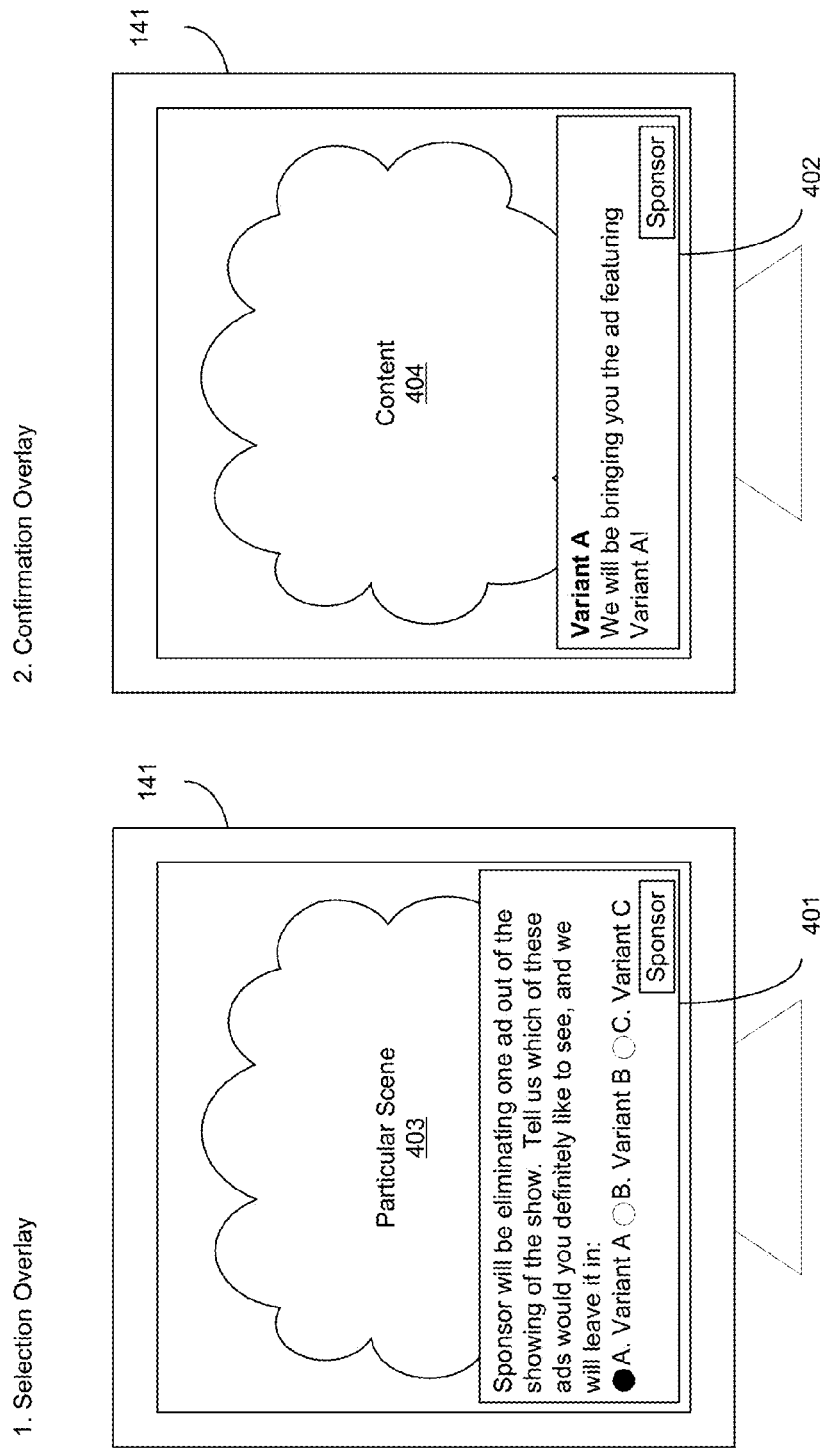

METHOD AND SYSTEM FOR CONTEXTUAL ADVERTISEMENT REPLACEMENT UTILIZING AUTOMATIC CONTENT RECOGNITION

CROSS-REFERENCE TO RELATED APPLICATIONS/INCORPORATION BY REFERENCE

This patent application is a Continuation Application of U.S. patent application Ser. No. 13/730,530, filed Dec. 28, 2012, which claims benefit from U.S. Provisional Application Ser. No. 61/596,012, which was filed on Feb. 7, 2012.

This application makes reference to:
U.S. patent application Ser. No. 13/730,359 filed on Dec. 28, 2012;
U.S. patent application Ser. No. 13/730,422 filed on Dec. 28, 2012;
U.S. patent application Ser. No. 13/730,459 filed on Dec. 28, 2012;
U.S. patent application Ser. No. 13/730,495 filed on Dec. 28, 2012;
U.S. patent application Ser. No. 13/730,754 filed on Dec. 28, 2012;
U.S. patent application Ser. No. 13/730,559 filed on Dec. 28, 2012;
U.S. patent application Ser. No. 13/730,579 filed on Dec. 28, 2012;
U.S. patent application Ser. No. 13/730,593 filed on Dec. 28, 2012;
U.S. patent application Ser. No. 13/730,759 filed on Dec. 28, 2012;
U.S. patent application Ser. No. 13/730,627 filed on Dec. 28, 2012;
U.S. patent application Ser. No. 13/730,644 filed on Dec. 28, 2012;
U.S. patent application Ser. No. 13/730,656 filed on Dec. 28, 2012;
U.S. patent application Ser. No. 13/730,670 filed on Dec. 28, 2012;
U.S. patent application Ser. No. 13/730,691 filed on Dec. 28, 2012;
U.S. patent application Ser. No. 13/730,702 filed on Dec. 28, 2012;
U.S. patent application Ser. No. 13/730,718 filed on Dec. 28, 2012; and
U.S. patent application Ser. No. 13/730,734 filed on Dec. 28, 2012.

Each of the above stated applications is hereby incorporated herein by reference in its entirety.

FIELD OF THE INVENTION

Certain embodiments of the invention relate to content recognition. More specifically, certain embodiments of the invention relate to a method and system for contextual advertisement replacement utilizing automatic content recognition.

BACKGROUND OF THE INVENTION

Smart or connected televisions (TVs) may receive data from data networks such as Internet networks that allow a viewer to not only access broadcast digital content, but also receive multimedia content. With the proliferation of connected TVs and wireless communication devices such as smartphones and tablets, content or network providers now have a plethora of avenues for distributing media including programming, advertisements and interactive content.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for contextual advertisement replacement utilizing automatic content recognition, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 4A-4B are block diagrams illustrating an exemplary variant of an advertisement based on viewer interaction, in accordance with an embodiment of the invention.

DETAILED DESCRIPTION OF THE INVENTION

Figure 1A:
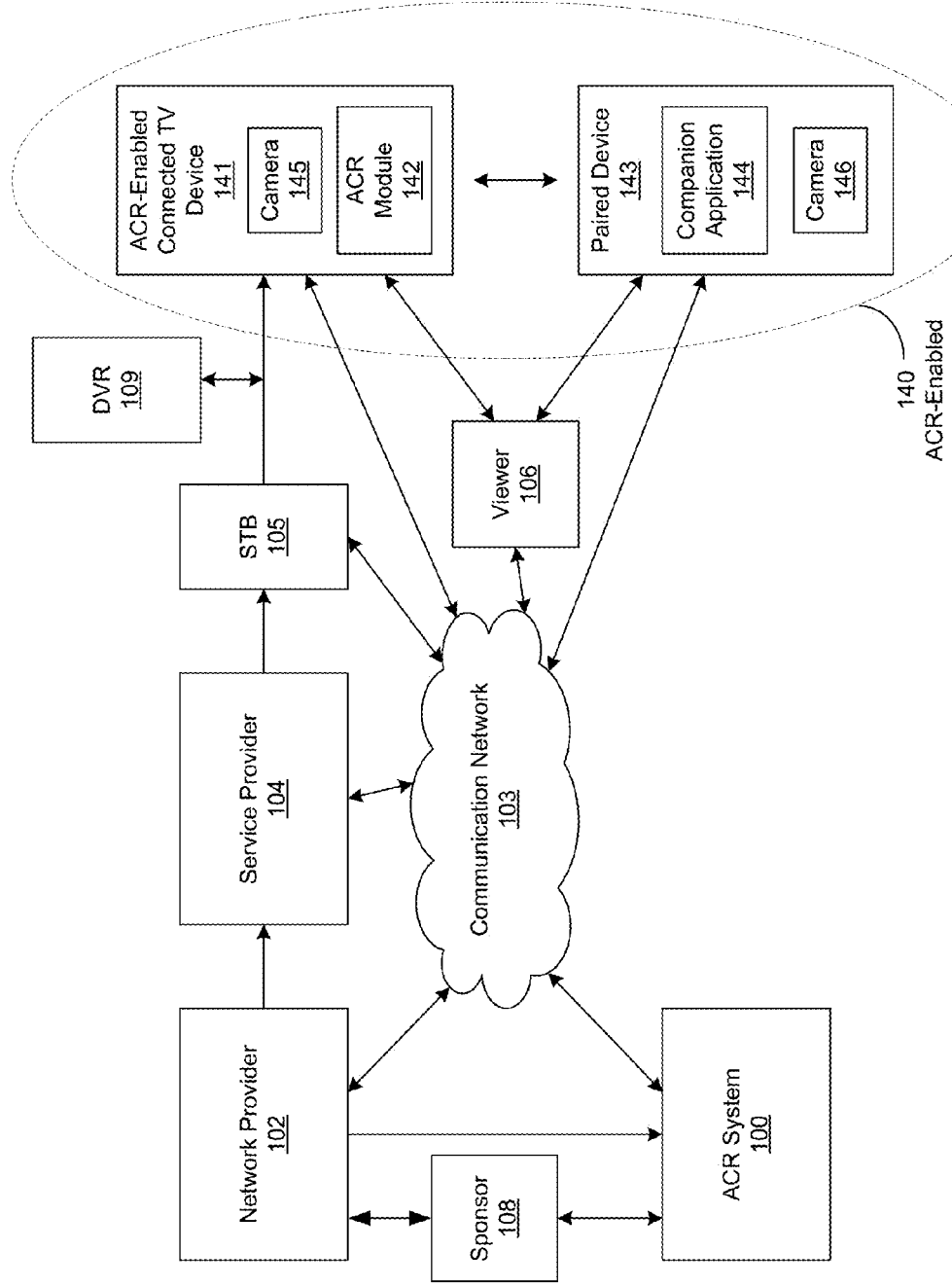
FIG. 1A is a block diagram illustrating an exemplary communication system, in accordance with an embodiment of the invention.

Certain embodiments of the invention can be found in a method and system for contextual advertisement replacement utilizing automatic content recognition. In various embodiments of the invention, an automatic content recognition (ACR)-enabled connected TV device may be operable to identify, utilizing ACR, viewer interaction and/or viewer information associated with the ACR-enabled connected TV device. The ACR-enabled connected TV device may be operable to present, utilizing the ACR, a variant of an advertisement associated with a sponsor in a next ad pod or commercial break during presentation of content, based on the identified viewer interaction and/or the identified viewer information. In instances when the ACR-enabled connected TV device is paired with or associated with a paired device utilizing a companion application running on the paired device, the variant of the advertisement may also be presented on the paired device.

In an exemplary embodiment of the invention, the ACR-enabled connected TV device may be operable to detect, utilizing the ACR, a particular scene in the presented content or in an ad spot associated with the sponsor. Based on the detection, the ACR-enabled connected TV device may present, utilizing the ACR a selection overlay, which allows a viewer to select the variant of the advertisement in the next ad pod. The viewer may interact with the selection overlay and accordingly select the variant of the advertisement, and the viewer interaction and the selected variant may be identified by the ACR-enabled connected TV device, utilizing the ACR. The ACR-enabled connected TV device may be operable to present, utilizing the ACR, a confirmation overlay, which may confirm the selected variant of the advertisement. An information overlay may be presented by the ACR-enabled connected TV device before the next ad pod, utilizing the ACR. The information overlay may indicate that the variant of the advertisement is to be presented in the next ad pod. In such instances, the ACR-enabled connected TV device may be operable to present, utilizing the ACR, the selected variant of the advertisement associated with the sponsor in the next ad pod, based on the viewer interaction or selection.

In an exemplary embodiment of the invention, during a first ad pod, the ACR-enabled connected TV device may be operable to present, utilizing the ACR, a polling overlay related to the advertisement associated with the sponsor for viewer responses. The viewer may interact with the polling overlay in order to provide corresponding viewer responses, and the corresponding viewer responses may be identified by the ACR-enabled connected TV device, utilizing the ACR. In such instances, the ACR-enabled connected TV device may be operable to present, utilizing the ACR, the variant of the advertisement associated with the sponsor in the next ad pod, based on one or more outcomes of the polling.

In some embodiments of the invention, the viewer information may comprise customized preferences profile(s) or default preferences setting(s) associated with the ACR-enabled connected TV device. The viewer information may comprise, for example, viewing habits, time of day and/or location associated with the ACR-enabled connected TV device. The viewer information may also comprise, for example, objects and/or events that may be captured by a camera in or associated with the ACR-enabled connected TV device and/or a camera in or associated with the paired device.

In an exemplary embodiment of the invention, the ACR-enabled connected TV device may be operable to identify or determine, utilizing the ACR, that an episode of a show stored in a digital video recorder (DVR) associated with the ACR-enabled connected TV device has passed a C3 rating time window, and the advertisement associated with the sponsor was placed in the next ad pod in the episode. In instances when the stored episode of the show is presented via a DVR playback after the C3 rating time window, the ACR-enabled connected TV device may be operable to present, utilizing the ACR, in the next ad pod, a new version of the advertisement associated with the sponsor, based on the identification, where the new version of the advertisement may be associated with a new episode of the show, and presentation of the new version of the advertisement may result in a C3 rating credit for the show.

In another exemplary embodiment of the invention, the ACR-enabled connected TV device may be operable to identify or determine, utilizing the ACR, that an episode of a show stored in a DVR associated with the ACR-enabled connected TV device has passed a C3 rating time window, the episode stored in the DVR has not been played back for viewing, and the advertisement associated with the sponsor was placed in the next ad pod in the episode. During presentation of a new episode of the show, the ACR-enabled connected TV device may be operable to detect, utilizing the ACR, a pause during the presentation of the new episode, where a new version of the advertisement may be associated with the new episode, and presentation of the new version of the advertisement may result in a C3 rating credit for the show.

Based on the identification and the detection, the ACR-enabled connected TV device may be operable to present, utilizing the ACR, an option overlay offering viewing of the episode stored in the DVR via a DVR playback. The viewer interaction with the option overlay for choosing viewing of the stored episode may then be identified by the ACR-enabled connected TV device, utilizing the ACR. In instances when the stored episode of the show is presented via the DVR playback based on the identified viewer interaction, the ACR-enabled connected TV device may be operable to present, utilizing the ACR, in the next ad pod, the new version of the advertisement associated with the sponsor. In such instances, the presentation of the new version of the advertisement may result in the C3 rating credit for the show, and the new episode may be recorded in the DVR for later viewing.

FIG. 1A is a block diagram illustrating an exemplary communication system, in accordance with an embodiment of the invention. Referring to FIG. 1A, there is shown an ACR system 100, a network provider 102, a communication network 103, a service provider 104, a set-top box (STB) 105, a DVR 109 and ACR-enabled devices 140. The ACR-enabled devices 140 may comprise an ACR-enabled connected TV device 141 and a paired device 143. The ACR-enabled connected TV device 141 may comprise an ACR module 142 and a camera 145. The paired device 143 may comprise a companion application 144 and a camera 146.

The ACR system 100 may comprise suitable logic, circuitry, interfaces and/or code that may be operable to support automatic content recognition operations in the ACR-enabled devices 140 such as the ACR-enabled connected TV device 141. The ACR system 100 may provide automatic content recognition applications and/or services to the ACR-enabled devices 140. The ACR system 100 may support a plurality of automatic content recognition technologies and may provide appropriate synchronization to the ACR-enabled connected TV device 141 and/or to the corresponding paired device 143. For example, the ACR system 100 may implement an abstraction layer to support a plurality of different fingerprinting technologies for the automatic content recognition. In this regard, the ACR system 100 may utilize fingerprints to identify content. More details of the operation of the ACR system 100 may be described below with respect to, for example, FIGS. 1B, 2A-2C.

In an exemplary embodiment of the invention, the ACR system 100 may be utilized to identify and maintain viewer interactions and/or viewer information associated with the ACR-enabled devices 140 such as the ACR-enabled connected TV device 141. The ACR system 100 may be utilized to identify that an episode of a show stored in a DVR such as the DVR 109 associated with the ACR-enabled connected TV device 141 has passed a C3 rating time window.

A C3 rating is a commercial rating released by Nielsen Company. The C3 rating is a measurement for average commercial minutes in live programming plus three days of DVR playback. In this regard, during this C3 rating time window, presentation of an advertisement placed in content or a show may result in a C3 rating credit for the content or the show. In instances when the content or the show is presented after the C3 rating time window via for example, DVR playback, the presentation of the advertisement may not result in a C3 rating credit for the content or the show.

The network provider 102 may comprise suitable logic, circuitry, interfaces and/or code that may be operable to generate, capture and/or package content such as TV programming or multimedia content that may be distributed to display devices such as the ACR-enabled devices 140. For example, the content may be distributed to the ACR-enabled connected TV device 141 via the service provider 104 and the STB 105 or via the communication network 103. In an exemplary embodiment of the invention, the network provider 102 may provide content to the ACR system 100 for supporting the automatic content recognition operation.

The communication network 103 may comprise suitable logic, circuitry, interfaces and/or code that may be operable to provide communication among a plurality of entities via various wire-line and/or wireless technologies such as, for example, T1/E1, DSL, cable modem, FTTx, PLC and/or WiMAX. The communication network 103 may comprise, for example, Internet and/or another multimedia network.

The service provider 104 may comprise suitable logic, circuitry, interfaces and/or code that may be operable to provide services using different access technologies to display devices such as the ACR-enabled devices 140. For example, the service provider 104 may provide connections to the ACR-enabled connected TV device 141 via the STB 105. Such connections may be utilized by the ACR-enabled connected TV device 141 to access content provided by the network provider 102.

The STB 105 may comprise suitable logic, circuitry, interfaces and/or code that may be operable to connect a display device such as the ACR-enabled connected TV device 141 to an external source of signals, such as the service provider 104, and to convert those signals into content that may be displayed on the screen of the ACR-enabled connected TV device 141. The STB 105 may be operable to provide processing associated with managing, delivering, and/or storing video content that may be displayed on the ACR-enabled connected TV device 141.

The digital video recorder (DVR) 109 may comprise suitable logic, circuitry, interfaces and/or code that may be operable to record video in a digital format to a disk drive, USB flash derive, SD memory card or other memory medium within the DVR 109. In an exemplary embodiment of the invention, the DVR 109 may be coupled to or associated with the ACR-enabled connected TV device 141.

The ACR-enabled connected TV device 141 may comprise suitable logic, circuitry, interfaces and/or code that may be operable to receive content for presenting to a viewer such as the viewer 106. The content may comprise interactive content with which the viewer 106 may interact. In addition to receiving content via the service provider 104 and the STB 105, the ACR-enabled connected TV device 141 may receive content from Internet via the communication network 103. In an exemplary embodiment of the invention, the ACR-enabled connected TV device 141 may comprise an ACR module 142. The ACR module 142 may comprise suitable logic, circuitry, interfaces and/or code that may be operable to provide automatic content recognition functions for the ACR-enabled connected TV device 141. The ACR module 142 may communicate with the ACR system 100, via the communication network 103, to support the automatic content recognition operations of the ACR-enabled connected TV device 141. For example, the ACR module 142 may support the automatic content recognition operations on video content provided by the network provider 102 via the service provider 104, or on video content being played back from a DVR such as the DVR 109 or similar device.

The ACR module 142 may, for example, provide fingerprints to the ACR system 100 for matching. The ACR module 142 may receive ACR related information or content from the ACR system 100, for example. The ACR module 142 may be operable to run or execute a synchronous event manager to monitor events that occur internal to the ACR-enabled connected TV device 141 and/or events from sources external to the ACR-enabled connected TV device 141. The synchronous event manager may be run as a background process that may be transparent to the user. The synchronous event manager may be executed continuously during those periods where monitoring is to take place. An example of events from external sources may include, but need not be limited to, an overlay event corresponding to an automatic content recognition match. Examples of internal events may include, but need not be necessarily limited to, a process, an application, and/or a function corresponding to the automatic content recognition performed by the ACR-enabled connected TV device 141. In response to detected event triggers, the synchronous event manager may request and receive applications, such as user-interaction applications, which may be executed to produce interactive opportunities that may be presented to a viewer such as the viewer 106, for example. The synchronous event manager may be implemented, for example, in software, firmware and/or hardware.

In an exemplary embodiment of the invention, the ACR module 142 may be operable to identify, utilizing for example the ACR system 100, viewer interaction and/or viewer information associated with the ACR-enabled connected TV device 141. Based on the identified viewer interaction and/or the identified viewer information, the ACR module 142 may be operable to cause, utilizing the ACR system 100, presentation of a variant of an advertisement associated with a sponsor such as the sponsor 108 in a next ad pod or commercial break during presentation of content or show.

The paired device 143 may comprise suitable logic, circuitry, interfaces and/or code that may be operable to pair with the ACR-enabled connected TV device 141 for automatic content recognition operations, including but not limited to second screen operations. Communication between the ACR-enabled connected TV device 141 and the paired device 143 may occur via a wireless communication protocol such as, for example, near field communication (NCF). The paired device 143 may pair with the ACR-enabled connected TV device 141 utilizing the companion application 144 downloaded in the paired device 143. For example, the companion application 144 may comprise a sync application downloaded in the paired device 143 from the ACR-enabled connected TV device 141. The paired device 143 may comprise, for example, a tablet, a laptop and/or a smartphone.

In operation, the ACR module 142 in the ACR-enabled connected TV device 141 may be operable to identify, utilizing for example the ACR system 100, viewer interaction and/or viewer information associated with the ACR-enabled connected TV device 141. The ACR module 142 in the ACR-enabled connected TV device 141 may be operable to cause, utilizing the ACR system 100, presentation of a variant of an advertisement associated with a sponsor such as the sponsor 108 in a next ad pod or commercial break during presentation of content, based on the identified viewer interaction and/or the identified viewer information. In instances when the ACR-enabled connected TV device 141 is paired with or associated with the paired device 143 utilizing the companion application 144 downloaded in and running on the paired device 143, the variant of the advertisement may also be presented on the paired device 143.

In an exemplary embodiment of the invention, the ACR module 142 in the ACR-enabled connected TV device 141 may be operable to detect, utilizing the ACR system 100, a particular scene in the presented content or in an ad spot associated with the sponsor 108. Based on the detection, a selection overlay for viewer selection of the variant of the advertisement in the next ad pod may be presented by the ACR module 142 in the ACR-enabled connected TV device 141, utilizing the ACR system 100. The viewer interaction with the selection overlay for selecting the variant of the advertisement may be identified by the ACR module 142 in the ACR-enabled connected TV device 141, utilizing the ACR system 100. For example, a viewer such as the viewer 106 may interact with the selection overlay to select the variant of the advertisement placed in the next ad pod. The ACR module 142 in the ACR-enabled connected TV device 141 may be operable to present, utilizing the ACR system 100, a confirmation overlay which may confirm the selection of the variant of the advertisement. An information overlay may be presented by the ACR module 142 in the ACR-enabled connected TV device 141 before the next ad pod, utilizing the ACR system 100. The information overlay may indicate that the variant of the advertisement is to be presented in the next ad pod. In such instances, the ACR module 142 in the ACR-enabled connected TV device 141 may be operable to cause, utilizing the ACR system 100, presentation of the selected variant of the advertisement associated with the sponsor 108 in the next ad pod, based on the viewer interaction or selection.

In an exemplary embodiment of the invention, during a first ad pod, the ACR module 142 in the ACR-enabled connected TV device 141 may be operable to present, utilizing the ACR system 100, a polling overlay related to the advertisement associated with the sponsor 108 for viewer responses. The viewer interaction with the polling overlay for providing the viewer responses may be identified by the ACR module 142 in the ACR-enabled connected TV device 141, utilizing the ACR system 100. For example, the viewer 106 may respond to the polling questions provided in the polling overlay via interaction with the polling overlay. In this regard, the interaction may comprise selecting options that may be presented in the polling overlay. In such instances, the ACR module 142 in the ACR-enabled connected TV device 141 may be operable to cause, utilizing the ACR system 100, presentation of the variant of the advertisement associated with the sponsor 108 in the next ad pod, based on one or more outcomes of the polling.

In some embodiments of the invention, the viewer information may comprise customized preferences profile(s) or default preferences setting(s) that may be associated with the ACR-enabled connected TV device 141 or associated with one or more users of the ACR-enabled connected TV device 141. The viewer information may comprise, for example, viewing habits, time of day and/or location associated with the ACR-enabled connected TV device 141. In this regard, for example, the sponsor 108 of an advertisement may comprise a fast food chain. An advertisement for a restaurant of the fast food chain indicating that the restaurant is open late may be presented late in the day, for example, around the time when most other restaurants are closed such as after 10 pm at night to about 6 am, while another advertisement for another (or the same) restaurant of the fast food chain providing breakfast meals may be presented early in the day, for example, around the time when people are likely to have breakfast. Another example may be that, based on the identified viewer preferences, time of day and/or location associated with the ACR-enabled connected TV device 141, the actor and/or the actress featuring the same advertisement associated with the sponsor 108 may be different. The viewer information may also comprise, for example, objects and/or events captured by a camera such as the camera 145 in or associated with the ACR-enabled connected TV device 141 and/or a camera such as the camera 146 in or associated with the paired device 143. In this regard, for example, the viewer information may comprise children, pets and/or total number of people that may be captured by the camera 145 and/or the camera 146.

In an exemplary embodiment of the invention, the ACR module 142 in the ACR-enabled connected TV device 141 may be operable to identify, utilizing the ACR system 100, that an episode of a show stored in the DVR 109 associated with the ACR-enabled connected TV device 141 has passed a C3 rating time window, and the advertisement associated with the sponsor 108 was placed in the next ad pod for that sponsor in the episode. In instances when the stored episode of the show is presented via a DVR playback after the C3 rating time window, the ACR module 142 in the ACR-enabled connected TV device 141 may be operable to cause, utilizing the ACR system 100, in the next ad pod, presentation of a new version of the advertisement associated with the sponsor 108, based on the identification, where the new version of the advertisement may be associated with a new episode of the show, and presentation of the new version of the advertisement may result in a C3 rating credit for the show.

In another exemplary embodiment of the invention, the ACR module 142 in the ACR-enabled connected TV device 141 may be operable to identify, utilizing the ACR system 100, that an episode of a show stored in the DVR 109 associated with the ACR-enabled connected TV device 141 has passed a C3 rating time window, the episode stored in the DVR 109 has not been played back for viewing, and the advertisement associated with the sponsor 108 was placed in the next ad pod for that sponsor in the stored episode. During presentation of a new episode of the show, the ACR module 142 in the ACR-enabled connected TV device 141 may be operable to detect, utilizing the ACR system 100, a pause during the presentation of the new episode, where a new version of the advertisement may be associated with the new episode, and presentation of the new version of the advertisement may result in a C3 rating credit for the show.

Based on the identification and the detection, the ACR module 142 in the ACR-enabled connected TV device 141 may be operable to present, utilizing the ACR system 100, an option overlay offering viewing of the episode stored in the DVR 109 via a DVR playback. The viewer interaction with the option overlay for choosing viewing of the stored episode may then be identified by the ACR module 142 in the ACR-enabled connected TV device 141, utilizing the ACR system 100. For example, the viewer 106 may choose to view the episode stored in the DVR 109, via interaction with the option overlay. In instances when the stored episode of the show is presented via the DVR playback based on the identified viewer interaction, the ACR module 142 in the ACR-enabled connected TV device 141 may be operable to cause, utilizing the ACR system 100, in the next ad pod, presentation of the new version of the advertisement associated with the sponsor 108. In such instances, the presentation of the new version of the advertisement may result in the C3 rating credit for the show, and the new episode may be recorded and stored in the DVR 109 for later viewing.

Figure 1B:
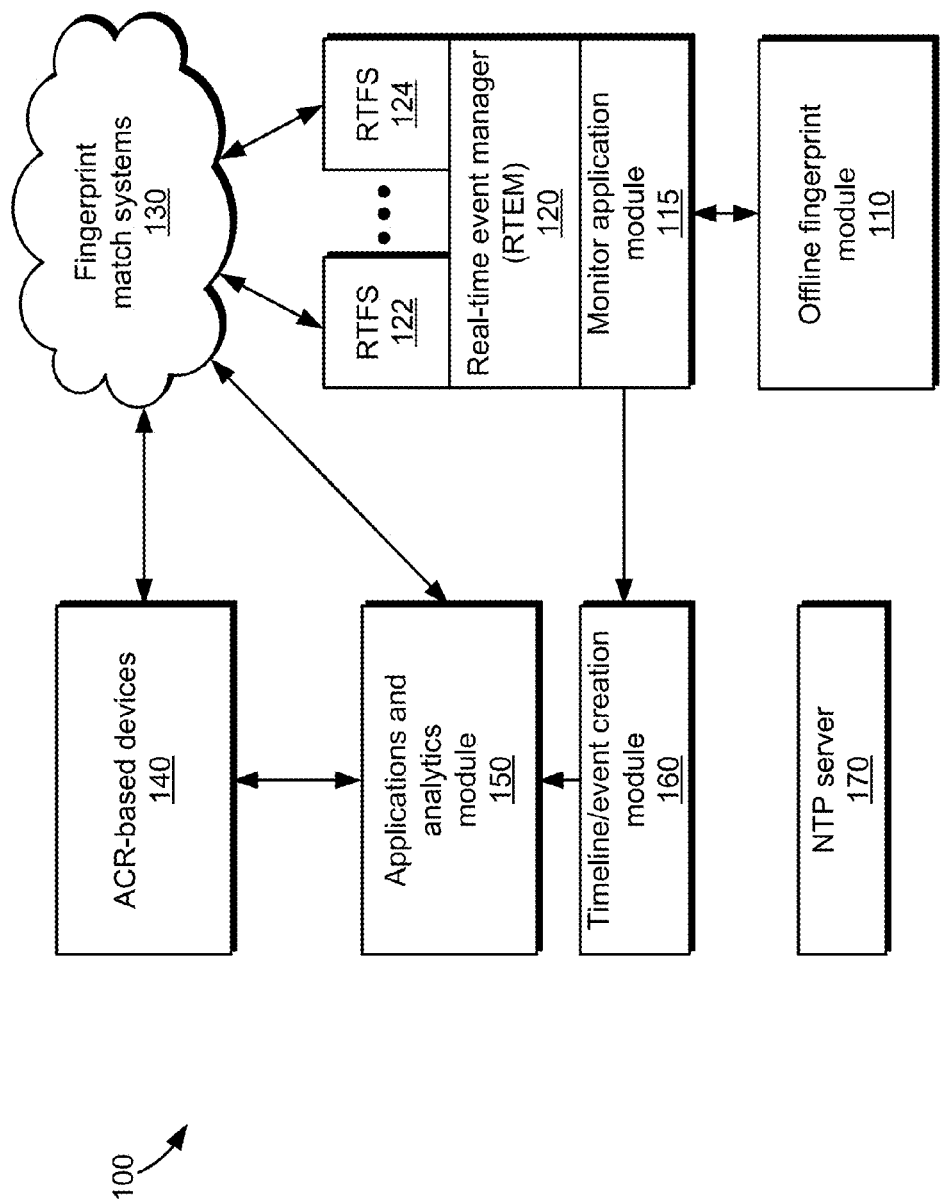
FIG. 1B is a high-level block diagram illustrating an exemplary automatic content recognition system with an abstraction layer, in accordance with an embodiment of the invention.

FIG. 1B is a high-level block diagram illustrating an exemplary automatic content recognition system with an abstraction layer, in accordance with an embodiment of the invention. Referring to FIG. 1B, there is shown an ACR system 100 that implements an abstraction layer to support fingerprinting technology from multiple vendors. The ACR system 100 is operable to support fingerprinting technology from multiple vendors and may be utilized to identify a network television station that provides content for display on a viewing screen based on the logo, symbol, sign, watermark, and/or text that are typically utilized to represent the network television station.

The ACR system 100 may comprise an offline fingerprint module 110, a monitor application module 115, a real-time event manager (RTEM) 120, a plurality of RTFSs 122, . . . , 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, . . . , 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, . . . , 124.

The RTFSs 122, . . . , 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, . . . , 124 may be a dedicated server for each of the fingerprint technologies supported by the ACR system 100. In some embodiments of the invention, a portion of the RTFSs 122, . . . , 124 may be operable to perform video fingerprinting while the remaining portion of the RTFSs 122, . . . , 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, . . . , 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, . . . , 124. In other instances, the fingerprinting locations may be determined by the RTFSs 122, . . . , 124 based on locally and/or remotely stored information. Each fingerprinting location may comprise coordinates in a video frame (e.g., x coordinates, y coordinates) that indicate a particular region in the video frame to fingerprint.

The RTFSs 122, . . . , 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, . . . , 124 in response to the instructions received. In other instances, the fingerprint profiles comprising the fingerprinting locations may be received by the RTFSs 122, . . . , 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, . . . , 124 may be operable to communicate fingerprint profiles and/or fingerprint profile updates to the end-user devices 140 through the fingerprint match systems 130. Feedback and/or queries from the end-user devices 140 may be received by the RTFSs 122, . . . , 124 for processing. The RTFSs 122, . . . , 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, . . . , 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, . . . , 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, . . . , 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, . . . , 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

In operation, the ACR system 100 may generate a fingerprint profile that may be communicated to one of the end-user devices 140. The fingerprint profile may be communicated through one or more of the Real-time event manager 120, one of the RTFSs 122, . . . , 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
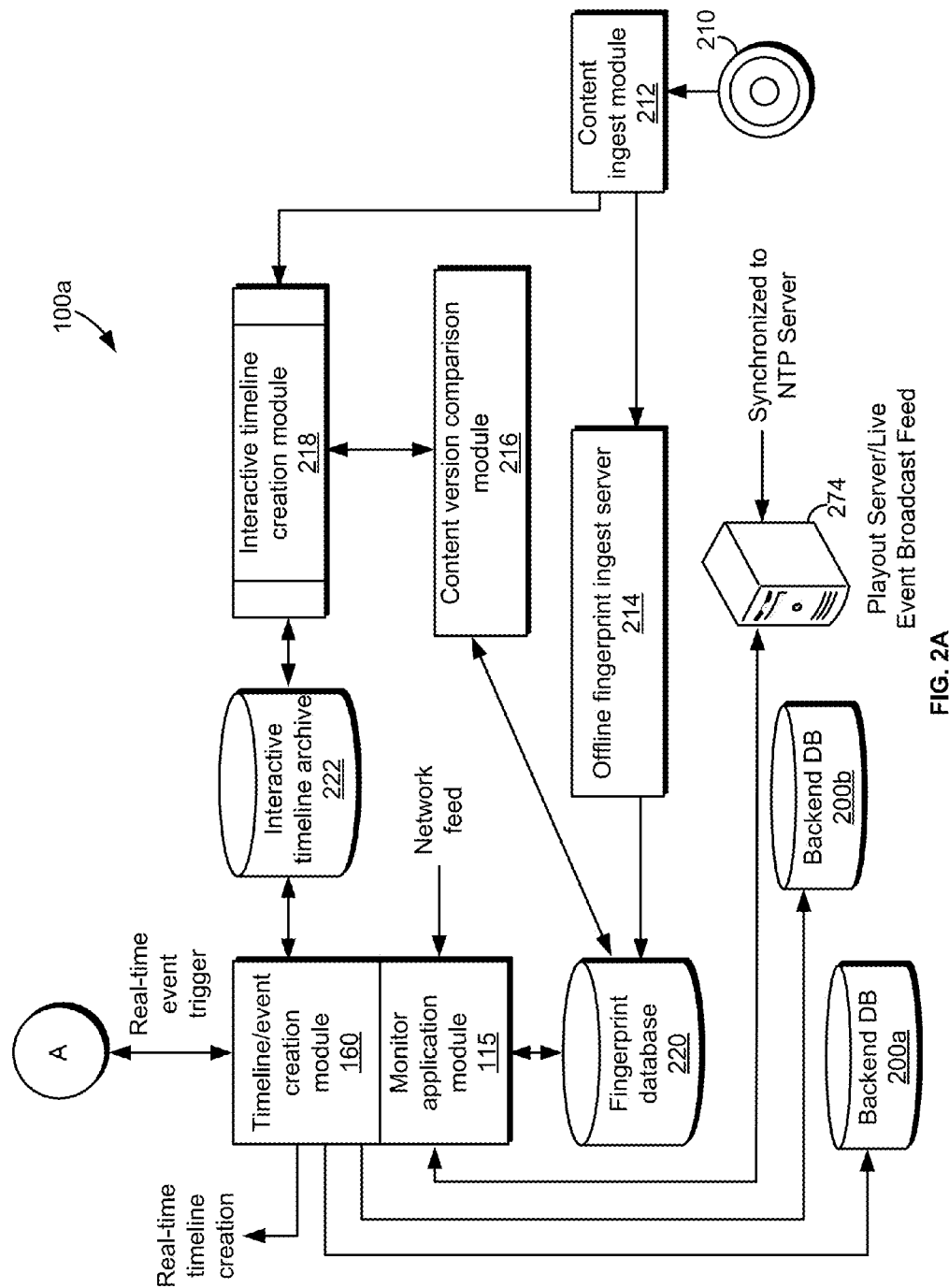
FIGS. 2A-2C are each a block diagram that illustrates details of the exemplary automatic content recognition system with an abstraction layer shown in FIG. 1B, in accordance with embodiments of the invention.
Figure 2B:
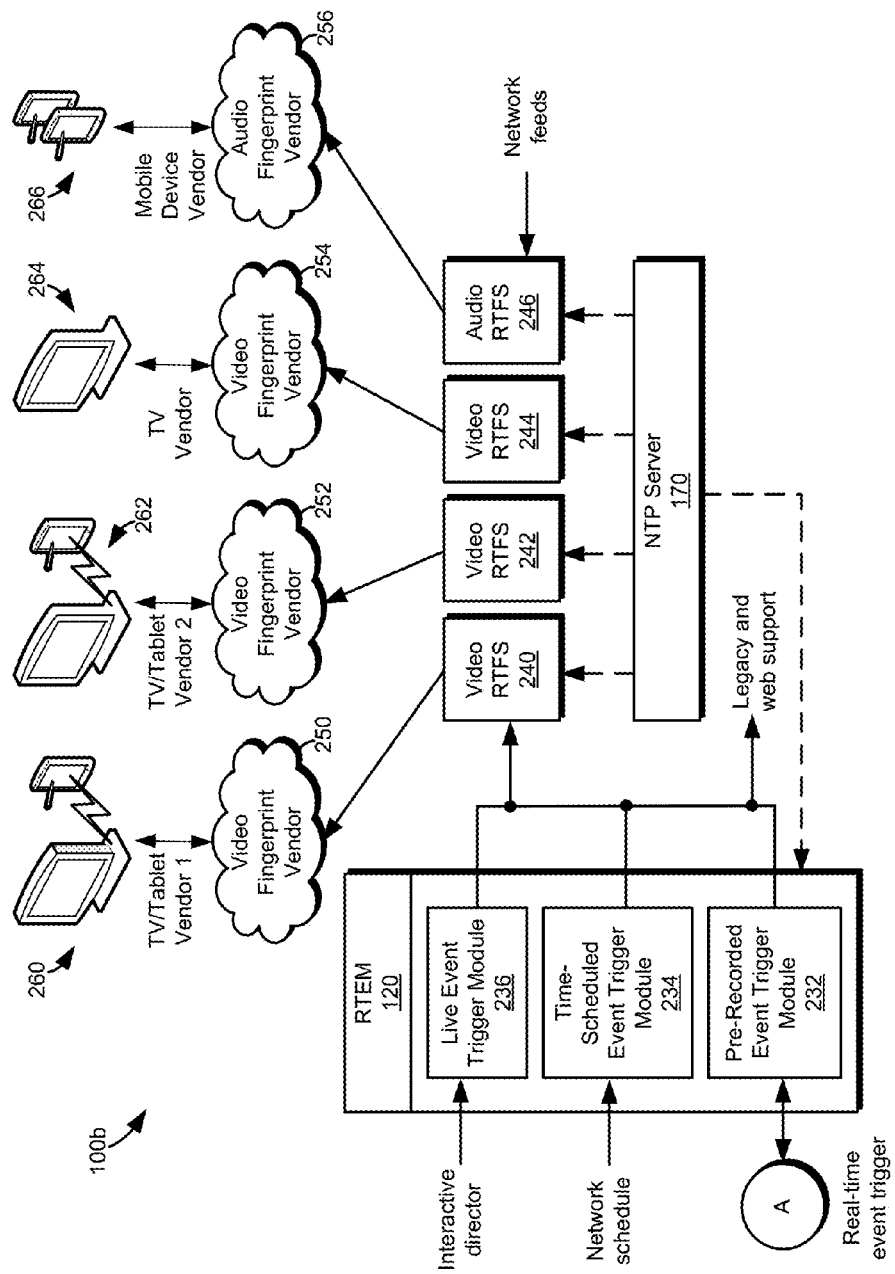
Figure 2C:
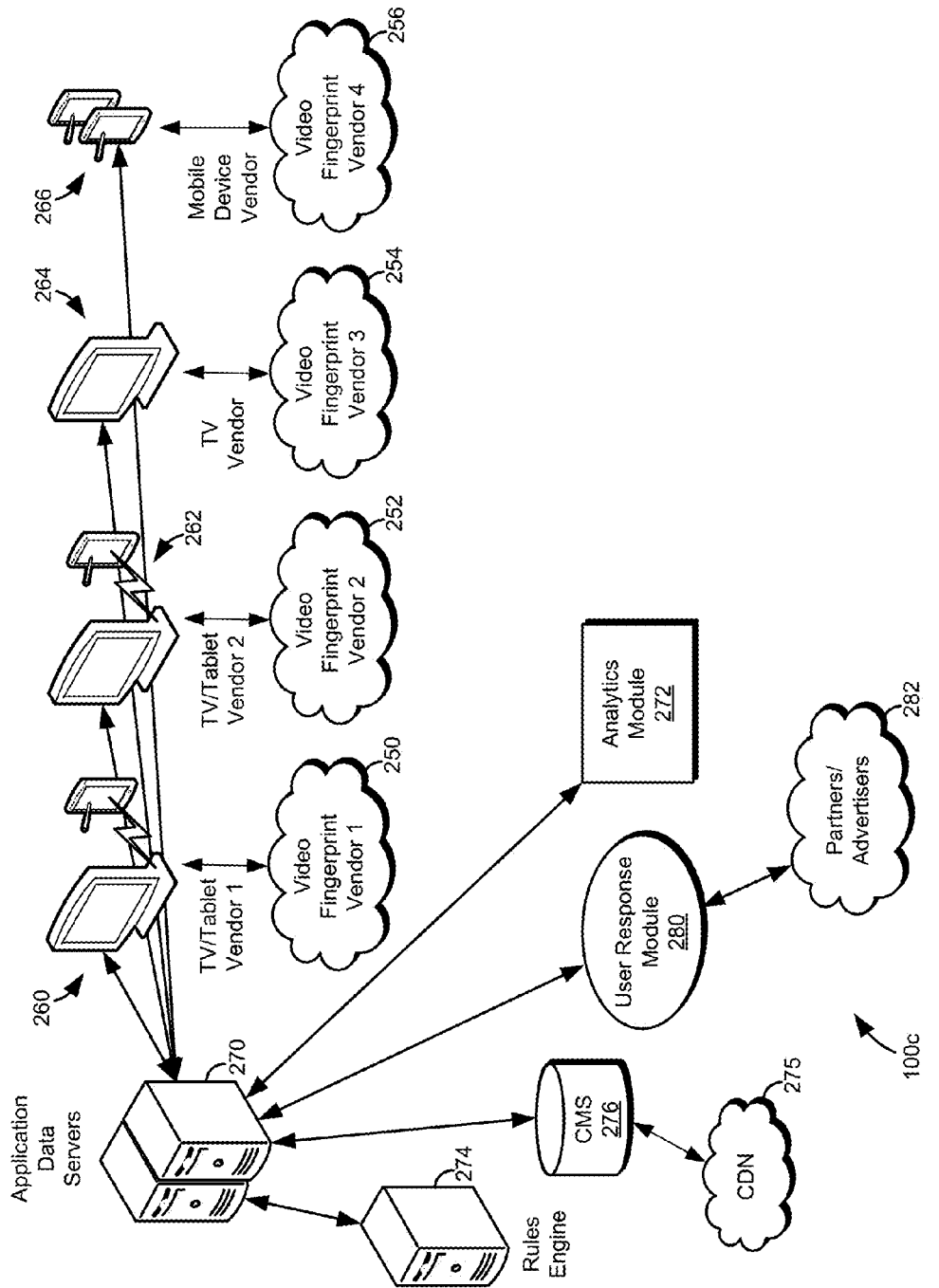

FIGS. 2A-2C are each a block diagram that illustrate details of the exemplary automatic content recognition system with abstraction layer shown in FIG. 1B, in accordance with embodiments of the invention. Referring to FIG. 2A, there is shown a portion 100a of the ACR system 100 that may substantially correspond to at least portions of the offline fingerprint module 110, the monitor application 115, and the timeline/event creation module 160 described above with respect to FIG. 1. The portion 100a may comprise a content ingest module 212, an offline fingerprint ingest server 214, a content version comparison module 216, and a fingerprint database 220. The portion 100a may also comprise an interactive timeline creation module 218, an interactive timeline archive 222, the monitor application module 115, and the timeline/event creation module 160. Also shown are backend databases (DB) 200a and 200b connected to the timeline/event creation module 160 and a playout server 274 connected to the monitor application module 115.

The content ingest module 212 may comprise suitable logic, circuitry, code, and/or interfaces that may be operable to receive a media master 210, also referred to as an air master, which may comprise one or more programs, commercials, and/or promotions, for example. The content ingest module 212 may be operable to generate or create a set of proxy videos by enciding the media master 210 utilizing different resolutions. The highest quality proxy video may be provided as an input to the offline fingerprint ingest server 214 while the lowest quality proxy video may be provide to the interactive timeline creation module 218. The content ingest module 212 may also provide a content ID (CID) and other associated metadata (e.g., program data, frame number) that corresponds to the content in the media master 210.

The offline fingerprint ingest server 214 may comprise suitable logic, circuitry, code, and/or interfaces that may be operable to use a fingerprint computation or algorithm to fingerprint content and subsequently push the fingerprints for archival in the fingerprint database 220. In the offline fingerprint ingest server 214, the highest quality proxy video created by the content ingest module 212 may be fingerprinted and may be associated with the content ID and corresponding related metadata. In this regard, the offline fingerprint ingest server 214 may utilize an API to automatically ingest the media files and associated metadata from the content ingest module 212. A graphical user interface (GUI) may also be supported to manually ingest media files and to enter associated metadata.

The offline fingerprint ingest server 214 may be operable to provide a management interface for the fingerprint database 220 and/or the content version comparison module 216. For example, an API may be utilized to remove content from the fingerprint database 220. A GUI may also be supported to manually remove content from the fingerprint database 220. The offline fingerprint ingest server 214 may be operable to set priorities regarding the content to be ingested and processed. Moreover, the offline fingerprint ingest server 214 may be operable to support, among other features, the use of administration tools and the creation of reports, the ability to generate progress reports on processing content and errors, and/or recoverability after a shut down or crash.

The offline fingerprint ingest server 214 may be implemented utilizing multiple modules (not shown). These modules may be operable to perform one or more functions. Examples of those functions may comprise, without limitation, receiving the content to be fingerprinted in an input or watch folder, receiving and assigning CIDs and processing priority utilizing content ingest management tools, supporting an ACR process for writing fingerprints to the fingerprint database 220, and supporting administration tools utilized for monitoring and reporting.

The fingerprint database 220, which may also be referred to as a central fingerprint database, for example, may comprise suitable logic, circuitry, code, and/or interfaces that may be operable to store fingerprints captured by the offline fingerprint ingest server 214 and maintain the association between the captured fingerprints and a particular CID and media time.

In an embodiment of the invention, the fingerprint database 220 may support queries from multiple monitor applications 224. For example and without limitation, as many as 50 monitor applications 224 may query the fingerprint database 220. In response to a query, the fingerprint database 220 may return a CID and a media time associated with the fingerprint in a very short period of time, typically in less than one second. For example and without limitation, the return time by the fingerprint database 220 may be less than 10 milliseconds.

The fingerprint database 220 may also be operable to respond to requests from the content version comparison module 216 to identify differences between the master versions in the fingerprint database 220 and derivative works also ingested into the fingerprint database 220. For example, a movie may have different cuts or versions depending on the time of day and/or the network in which it is to be shown. The corresponding master and the derivative works may be ingested, fingerprinted, and stored in the fingerprint database 220. The interactive timeline creation module 218 may have access to the various versions of a certain work but it can identify the master version from any of the other cuts or versions. Typically, a request is initiated by the content version comparison module 216 to identify the differences (e.g., deltas) between the master and selected derivative works. A "delta" file is returned to the interactive timeline creation module 218, which incorporates the changes from the master source and automatically generates a derivative event timeline. Multiple derivative works may be compared to the master in the content version comparison module 216 to reduce the processing necessary to handle the other versions.

The fingerprint database 220 may be implemented as a distributed, fault-tolerant database that is operable to support persistent storage of fingerprints. The fingerprint database 220 may be operable to store large amounts of content fingerprints. For example and without limitation, the fingerprint database 220 may store up to 25,000 hours of content fingerprints. The number of hours of content fingerprints that can be stored may vary based on the availability of storage capacity in the fingerprint database 220.

The fingerprint database 220 may also be operable to concurrently support the reception of content from multiple offline fingerprint ingest servers 214, respond to queries from multiple monitor applications 224, and/or respond to queries from multiple content version comparison modules 216. For example and without limitation, the fingerprint database 220 may receive content from up to 10 offline fingerprint ingest servers 214. In another example and without limitation, the fingerprint database 220 may respond to queries from up to 50 monitor applications 224. In yet another example and without limitation, the fingerprint database 220 may respond to queries from up to five content version comparison modules 216. The number of requests and/or of content version comparison modules 216 that can be supported by the fingerprint database 220 may vary based on the capacity of the fingerprint database 220.

The fingerprint database 220 may be operable to support, among other features, administrative tools and report generation, management tools to report errors, and/or recoverability after a shut down or crash.

The fingerprint database 220 may be implemented utilizing multiple modules (not shown). These modules may comprise a fingerprint storage module as well as other modules that are operable to support the process of ingesting content from the offline fingerprint ingest server 214, the process of responding with a CID and media time to the monitor application module 115, and/or the process of responding to the content version comparison module 216. One or more modules may also be implemented to support administrative tools, monitoring, and/or reporting, for example.

The content version comparison module 216 may comprise suitable logic, circuitry, code, and/or interface that may be operable as a tool that enables comparison of a master version of some content to a derivative version of that same content based on fingerprints stored in the fingerprint database 220. A derivative work or piece may refer to a version of a program, promotion, or commercial, for example, that is different from a master version of that same program, promotion, or commercial. The content version comparison module 216 may return a file listing the differences between the master version and the derivative work based on a time code. The file may be provided to the interactive timeline creation module 218, for example.

The content version comparison module 216 may be operable to identify sequences that have been edited to shorten the time of handling the derivative work, the insertion of new advertisement break locations, and/or the insertion of new content. An example of the insertion of new advertisement break locations may comprise the addition of black frames of between 5 and 15 seconds. An example of the insertion of new content may occur in instances when the derivative work is the director's cut rather than the original theatrical master. The content version comparison module 216 may pass or communicate a difference file to the interactive timeline creation module 218 to be utilized for automating the creation of a new interactive timeline for a unique edit of a program based on the network, the day, and/or the time of day on which the program is to be shown.

The content version comparison module 216 may also be operable to query the fingerprint database 220 for information (e.g., fingerprints) to perform version comparison, to identify advertisement break locations based on black frames of between 5 and 15 seconds, and/or to generate an extensible markup language (XML) or similar output file that indicates the differences between a derivative piece and a master version. Moreover, the content version comparison module 216 may support, among other features, the use of administration tools and the creation of reports, the ability to generate progress reports on processing content and errors, and/or recoverability after a shut down or crash.

The content version comparison module 216 may be implemented utilizing multiple modules (not shown). These modules may be operable to perform one or more functions such as, for example, querying the fingerprint database 220 and performing file comparison. One or more modules may also be implemented to support administrative tools, for monitoring, and/or reporting, for example. The monitor application module 115 may comprise suitable logic, circuitry, code, and/or interfaces that may be operable to ingest a live broadcast television linear video feed and fingerprint the content in the feed in real time. The live broadcast television linear video feed may also be referred to as a network television feed, for example. The live broadcast television linear video feed can be based on a Serial Digital Interface (SDI) video interface and/or on a High-Definition SDI (HD-SDI) video interface. These fingerprints may be compared by the monitor application module 115 against fingerprints stored in the fingerprint database 220. When the comparison results in a fingerprint match, the fingerprint database 220 may return to the monitor application module 115 the CID and the media time of that match. The CID and the media time may then be provided to the timeline/event creation module 226. An API may be utilized to handle the communication between the monitor application module 115 and the timeline/event creation module 226.

As noted above, the monitor application module 115 may be operable to support, for example, a SDI and/or a HD-SDI for input that are provided from the broadcast chain prior to encoding and uplink. In this regard, the broadcast chain may provide the network television feed to the monitor application module 115. Other interfaces and/or formats may also be supported.

The monitor application module 115 may function so that it operates ahead of any ACR-based device or viewer device that is in the field, such as in a user's home, for example. Although the amount of time that the monitor application module 115 may be ahead from ACR-based devices in the field may vary, in a typical case the monitor application module 115 may be approximately at least 3 seconds ahead, for example.

The monitor application module 115 may be operable to query the fingerprint database 220 to determine the CID and the media time or media timeline. The monitor application module 115 may be operable to support an API that enables the monitor application module 115 to report the CID and the media time to a real-time event trigger infrastructure that is represented by the label "A" in FIG. 2A. Moreover, the monitor application module 115 may support, among other features, the use of administration tools and the creation of reports, the use of management tools for reporting errors, and/or the handling of failover/recovery operations.

The monitor application module 115 may be implemented utilizing multiple modules (not shown). These modules may comprise a module for video capture from an SDI/HD-SDI capture card, a module that provides real-time fingerprinting and querying of the fingerprint database 220, and a module that supports an API to communicate the CID, media time, and other data (e.g., duplicate CIDs, mediatime, confidence, number of seconds). One or more modules may also be implemented to support administrative tools, monitoring, and/or reporting, for example.

The timeline/event creation module 226, which may be implemented as part of the monitor application 226, may comprise suitable logic, circuitry, code, and/or interfaces that may be operable to query the interactive timeline archive 222 for events associated with the CID. The timeline/event creation module 226 may be operable to utilize the CID and the media time received by the monitor application module 115 from the fingerprint database 220 to look up event IDs in the interactive timeline archive 222. The event IDs are used to create a real-time timeline (i.e., schedule) in XML or other standard data format and real-time event triggers.

The interactive timeline creation module 218 may comprise suitable logic, circuitry, code, and/or interfaces that may be operable to utilize the proxy video generated by the content ingest module 212 and link an interactive timeline against the fingerprinted media. The interactive timeline may comprise one or more event IDs associated with a particular time in a program, commercial, or promotion. The interactive event IDs may be referred to as interactive event IDs, for example. The interactive timeline archive 222 may comprise suitable logic, circuitry, code, and/or interfaces that may be operable to store multiple interactive timelines.

In operation, the air master 210 is received and ingested by the content ingest module 212 and a proxy video is created. The highest quality proxy video generated by the content ingest module 212 may be provided to the offline fingerprint ingest server 214 while a lower quality proxy video generated by the content ingest module 212 may be provided to the interactive timeline creation module 218. The offline fingerprint ingest server 214 may fingerprint the high quality proxy video and may send the fingerprints to the fingerprint database 220 for archiving. In addition to the fingerprints, CIDs and media times may be stored in the fingerprint database 220.

The interactive timeline creation module 218 may receive the proxy video and may link event IDs that represent certain desired interactive events with the program's timeline to generate an interactive timeline. The interactive timeline may be stored in the interactive timeline archive 222.

When a derivative piece or different version from a master version is ingested, the content version comparison module 216 may compare fingerprints of the master version with fingerprints from the derivative piece to generate a difference file that is provided to the interactive timeline creation module 218. The interactive timeline creation module 218 may utilize the difference file to create an interactive timeline for the derivative piece from an interactive timeline previously generated for the master version.

The monitor application module 115 receives a network television feed and fingerprints the video content in the feed. The fingerprints generated are compared to those stored in the fingerprint database 220 to obtain CIDs media times, and potentially to act when a match is detected. The interactive timeline archive 222 may be queried to obtain event IDs associated with the CIDs. When event IDs are obtained, the timeline/event creation module 226 may generate a real-time timeline XML (or similar data format) feeds and may also generate real-time event triggers that may be communicated to a real-time event trigger infrastructure.

Referring to FIG. 2B, there is shown a portion 100b of the ACR system 100 that may comprise the RTEM 120, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2B are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2B. The NTP server 170 of FIG. 1 is shown providing reference timing to the RTEM 120 and the RTFSs 240, 242, 244, and 246.

Also shown in FIG. 2B are various viewer devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The viewer devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the viewer devices 260. These services may comprise video fingerprint matching as well as the delivery of any interactive event IDs associated with a match. In addition, the video fingerprint vendor 250 may provide a network television station identifier and/or network timing information (e.g., heartbeat message or NTP-based network timestamp) that may be utilized by the viewer devices 260 for ACR-related applications and/or to maintain synchronization with the network television feed. The viewer devices 260 may comprise suitable logic, circuitry, code, and/or interfaces that may be operable to take and send video fingerprints to the video fingerprint vendor 250 for matching.

The viewer devices 262 may be operable to utilize the same video fingerprinting technology utilized by the video RTFS 242 and supported by the video fingerprint vendor 252. The video fingerprinting technology utilized by the viewer devices 262 may be different from that utilized by the viewer devices 260. The video fingerprint vendor 252 may be a vendor, manufacturer, or other third-party service provider that may comprise suitable logic, circuitry, code, and/or interfaces operable to provide hosted services over the internet for the viewer devices 262. These services may comprise video fingerprint matching as well as the delivery of any interactive event IDs associated with a match. In addition, the video fingerprint vendor 252 may provide a network television station identifier and/or network timing information that may be utilized by the viewer devices 262 for ACR-related applications and/or to maintain synchronization with the network television feed. The viewer devices 262 may comprise suitable logic, circuitry, code, and/or interfaces that may be operable to take and send video fingerprints to the video fingerprint vendor 252 for matching.

The viewer devices 260 and 262 may be operable with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The viewer devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the viewer devices 264. These services may comprise video fingerprint matching as well as the delivery of any interactive event IDs associated with a match. In addition, the video fingerprint vendor 254 may provide a network television station identifier and/or network timing information that may be utilized by the viewer devices 264 for ACR-related applications and/or to maintain synchronization with the network television feed. The viewer devices 264 may comprise suitable logic, circuitry, code, and/or interfaces that may be operable to take and send video fingerprints to the video fingerprint vendor 254 for matching.

The viewer devices 266 may utilize the same audio fingerprinting technology (e.g., audio ACR) utilized by the audio RTFS 246 and supported by the audio fingerprint vendor 256. The viewer devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the viewer devices 266. These services may comprise audio fingerprint matching as well as the delivery of any interactive event IDs associated with a match. In addition, the audio fingerprint vendor 256 may provide a network television station identifier and/or network timing information that may be utilized by the viewer devices 260 for ACR-related applications and/or to maintain synchronization with the network television feed. The viewer devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding viewer devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTEM 120 may comprise suitable logic, circuitry, code, and/or interfaces that may be operable to perform real-time event triggering. In this regard, the RTEM 120 may be operable to manage real-time events based on inputs from different sources. For example, the RTEM 120 may comprise a pre-recorded event trigger module 232 to provide real-time triggering from the monitor application module 115, a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 120 may also be operable to trigger interactive events in legacy television systems and/or in web-based systems. The infrastructure provided by the RTEM 120 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 120 may be operable to assign interactive event IDs to particular fingerprints in a sequence of audio or video fingerprints generated by the RTFSs 240, . . . , 246. The RTEM 120 may also be operable to provide television network station identifiers and/or network timing information associated with any sequence of fingerprints.

In the example shown in FIG. 2B, the RTFSs 240, . . . , 246 may correspond to the RTFSs 122, . . . , 124, the fingerprint vendors 250, . . . , 256 may correspond to the fingerprint match systems 130, and the viewer devices 260, . . . , 266 may correspond to the ACR-based devices 140, which are illustrated in FIG. 1.

In operation, the RTEM 120 may generate and/or handle one or more interactive event IDs that correspond to a particular set of fingerprints generated by the RTFSs 240, . . . , 246. The RTEM 120 may have determined the interactive event IDs based on live event inputs, time-scheduled event inputs, and/or pre-recorded event inputs. The RTEM 120 may assign or associate the interactive event IDs to their appropriate fingerprints based on the synchronization of its operation to the operation of the RTFSs 240, . . . , 246 via broadcast NTP. The RTEM 120 may also provide television network station identifiers and/or network timing information to the RTFSs 240, . . . , 246. The RTFSs 240, . . . , 246 may communicate the fingerprints, interactive event IDs, the television network station identifiers, and/or the network timing information to their corresponding fingerprint vendors.

The client or viewer devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100b in FIG. 2B may illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2C, there is shown a portion 100c of the ACR system 100 that may comprise the viewer devices 260, . . . , 266 and the fingerprint vendors 250, . . . , 256 shown in FIG. 2B. Also shown are application data servers 270, an analytics module 272, a rules engine 274, a cloud-based content delivery network (CDN) 275, and a content management system (CMS) 276. In addition, FIG. 2C shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to viewer devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., viewer devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the viewer devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the viewer devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may comprise one or more back-end databases to store, mange, and/or process user information.

In operation, content may be provided by the application data servers 270 to one of the viewer devices 260, . . . , 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on viewer devices. The advertisement servers may also be operable to support the tracking of user impressions and click-throughs and/or to perform other advertising-related functions.

Figure 3:
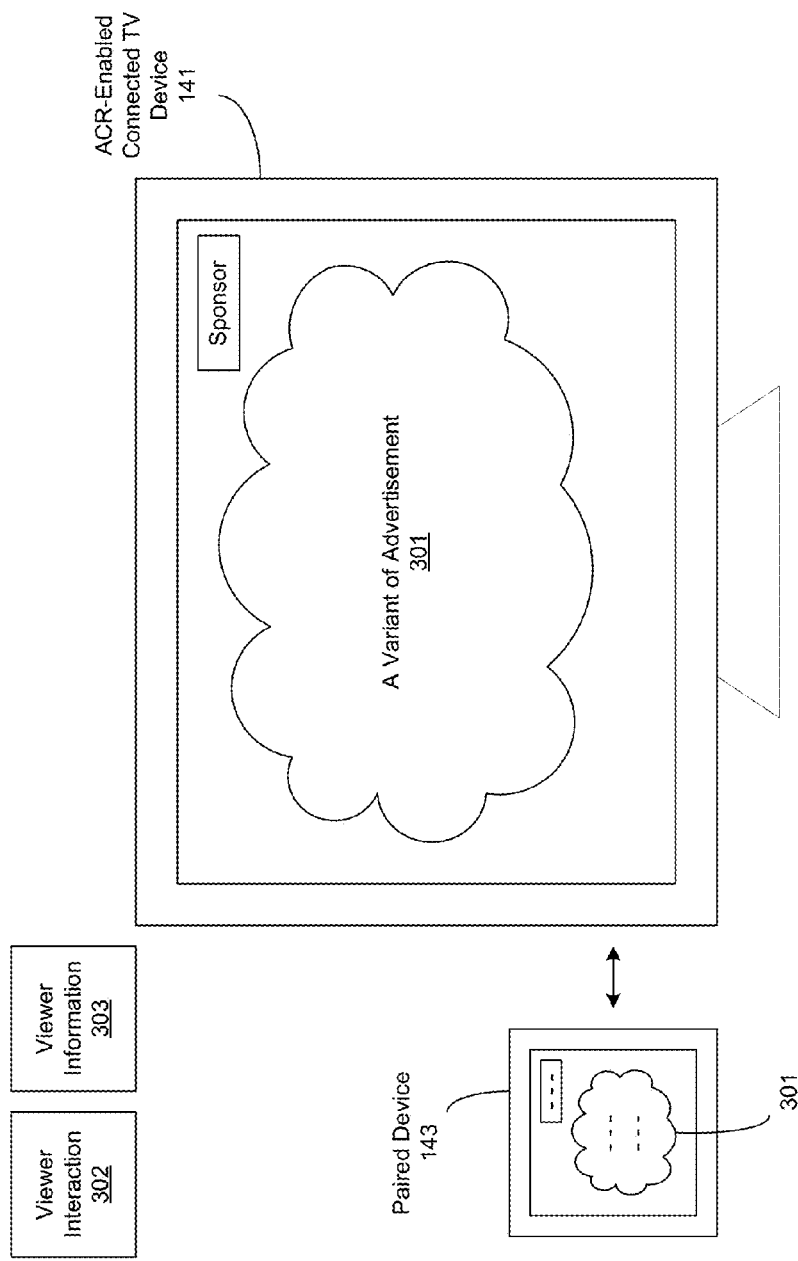
FIG. 3 is a block diagram illustrating an exemplary contextual advertisement replacement utilizing automatic content recognition, in accordance with an embodiment of the invention.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways FIG. 3 is a block diagram illustrating an exemplary contextual advertisement replacement utilizing automatic content recognition, in accordance with an embodiment of the invention. Referring to FIG. 3, there is shown an ACR-enabled connected TV device 141 presenting or displaying a variant 301 of an advertisement, a viewer interaction 302 and viewer information 303. The ACR-enabled connected TV device 141 may be paired with or associated with a paired device 143. The ACR-enabled connected TV device 141 and the paired device 143 are described with respect to FIG. 1A.

In an exemplary operation, the ACR module 142 in the ACR-enabled connected TV device 141 may be operable to identify, utilizing for example the ACR system 100, viewer interaction 302 and/or viewer information 303 associated with the ACR-enabled connected TV device 141. The ACR module 142 in the ACR-enabled connected TV device 141 may be operable to cause, utilizing the ACR system 100, presentation of a variant 301 of an advertisement associated with a sponsor such as the sponsor 108 in a next ad pod or commercial break during presentation of content, based on the identified viewer interaction 302 and/or the identified viewer information 303. In instances when the ACR-enabled connected TV device 141 is paired with or associated with the paired device 143 utilizing the companion application 144 downloaded in and running on the paired device 143, the variant 301 of the advertisement may also be presented on the paired device 143.

Figure 4B:
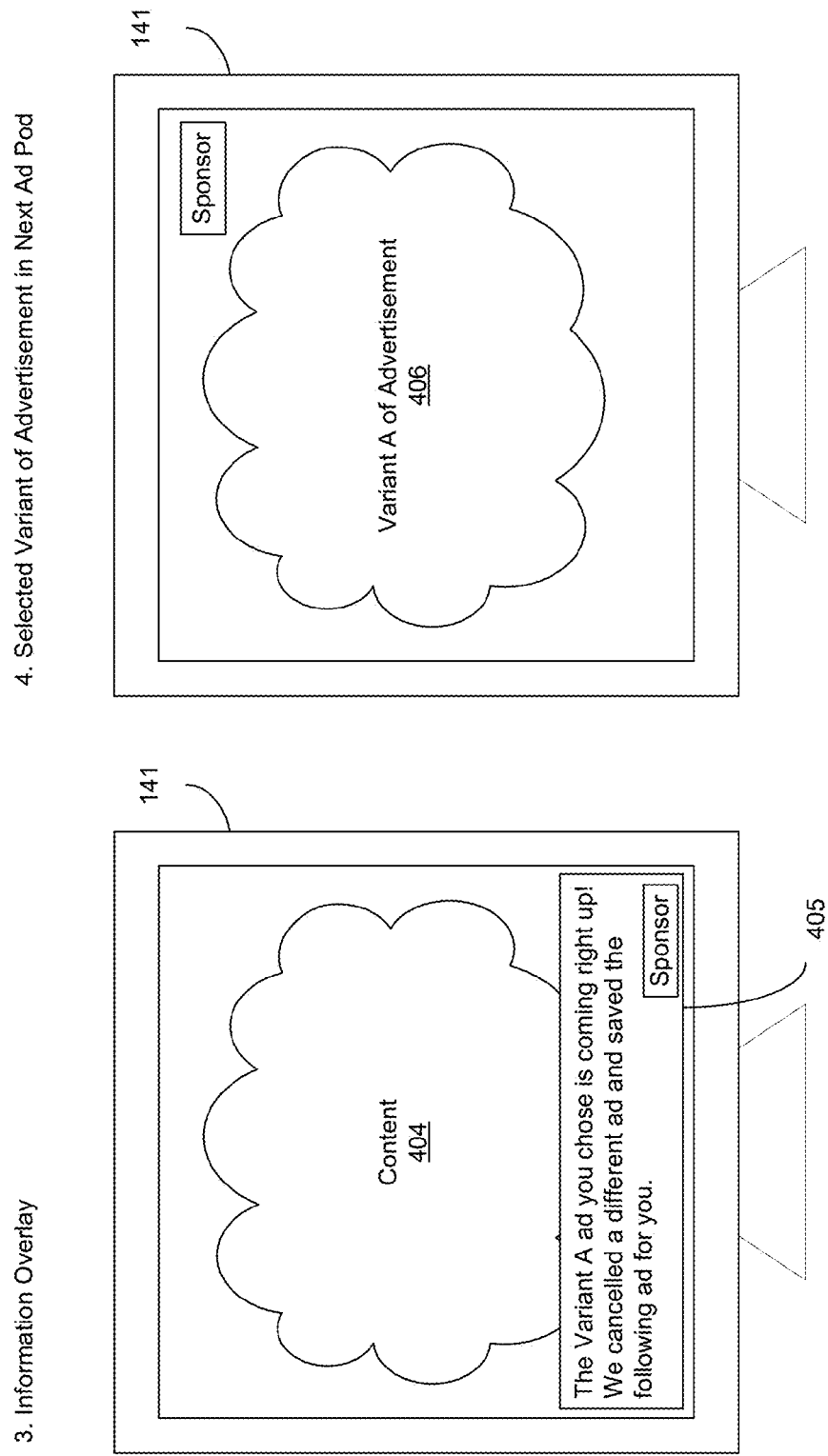

FIGS. 4A-4B are block diagrams illustrating an exemplary variant of an advertisement based on viewer interaction, in accordance with an embodiment of the invention. Referring to FIGS. 4A-4B, there is shown an ACR-enabled connected TV device 141. The ACR-enabled connected TV device 141 is described with respect to FIG. 1A. Referring to FIG. 4A, there is shown the ACR-enabled connected TV device 141 presenting a selection overlay 401 when a particular scene 403 is detected. The selection overlay 401 may be associated with a sponsor such as the sponsor 108. There is also shown in FIG. 4A the ACR-enabled connected TV device 141 presenting content 404 and a confirmation overlay 402. The confirmation overlay 402 is presented after viewer selection via interaction with the selection overlay 401. Referring to FIG. 4B, there is shown the ACR-enabled connected TV device 141 presenting content 404 and an information overlay 405. The information overlay 405 may be presented before the next ad pod. There is also shown in FIG. 4B the ACR-enabled connected TV device 141 presenting a selected variant 406 of an advertisement associated with the sponsor 108 in the next ad pod.

In an exemplary operation, the ACR module 142 in the ACR-enabled connected TV device 141 may be operable to detect, utilizing for example the ACR system 100, a particular scene 403 in the presented content or in an ad spot associated with the sponsor 108. Based on the detection, a selection overlay 401 for viewer selection of a variant of an advertisement in the next ad pod or commercial break may be presented by the ACR module 142 in the ACR-enabled connected TV device 141, utilizing the ACR system 100. The viewer interaction 302 with the selection overlay 401 for selecting the variant of the advertisement may be identified by the ACR module 142 in the ACR-enabled connected TV device 141, utilizing the ACR system 100. For example, a viewer such as the viewer 106 may interact with the selection overlay 401 for selecting variant A of the advertisement placed in the next ad pod. The ACR module 142 in the ACR-enabled connected TV device 141 may be operable to present, utilizing the ACR system 100, a confirmation overlay 402 which may confirm the selection of the variant A of the advertisement. An information overlay 405 may be presented by the ACR module 142 in the ACR-enabled connected TV device 141 before the next ad pod, utilizing the ACR system 100. The information overlay 405 may indicate that the variant A of the advertisement is to be presented in the next ad pod. In such instances, the ACR module 142 in the ACR-enabled connected TV device 141 may be operable to cause, utilizing the ACR system 100, presentation of the selected variant A 406 of the advertisement associated with the sponsor 108 in the next ad pod, based on the viewer selection.

As an example, the sponsor 108 of the advertisement may comprise a pet supplies and services retailer. The selection overlay 401 may comprise variant A, variant B and variant C for the viewer 106 to select. The variant A may feature a fun-loving Labrador retriever, the variant B may feature a cute bulldog puppy and the variant C may feature cat nutrition, for example. In instances when the viewer 106 selects variant A via interaction with the selection overlay 401, the confirmation overlay 402 may indicate that an ad featuring the fun-loving Labrador retriever will be brought to the viewer 106 in the next ad pod. The information overlay 405 may indicate that the ad featuring the fun-loving lab is coming right up. Accordingly, the selected ad featuring the fun-loving Labrador retriever is presented in the next ad pod.

Figure 5:
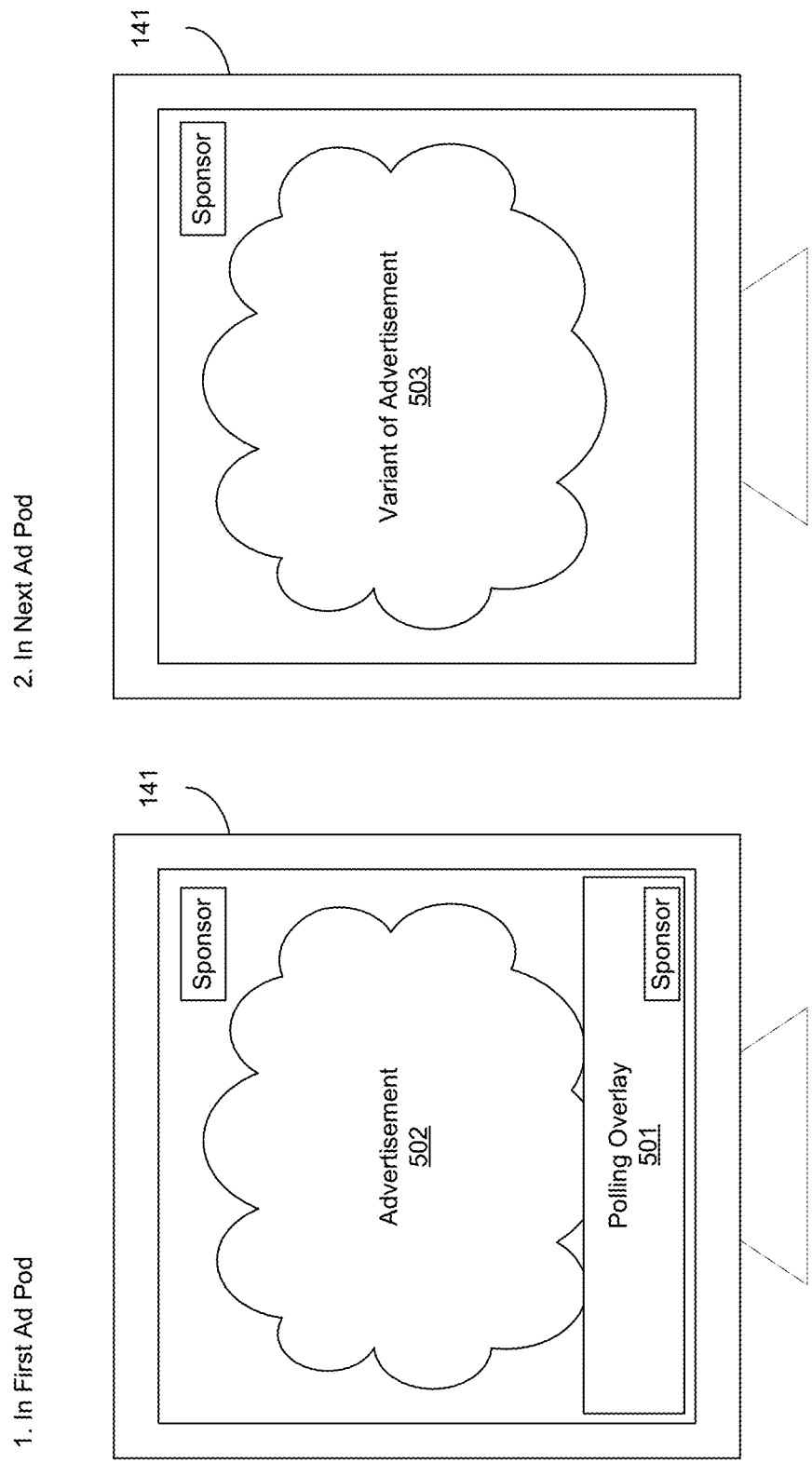
FIG. 5 is a block diagram illustrating an exemplary variant of an advertisement based on viewer interaction, in accordance with an embodiment of the invention.

FIG. 5 is a block diagram illustrating an exemplary variant of an advertisement based on viewer interaction, in accordance with an embodiment of the invention. Referring to FIG. 5, there is shown an ACR-enabled connected TV device 141 presenting an advertisement 502 and a polling overlay 501, in a first ad pod. The ACR-enabled connected TV device 141 is described with respect to FIG. 1A. The advertisement 502 and the polling overlay 501 may be associated with a sponsor such as the sponsor 108. There is also shown the ACR-enabled connected TV device 141 presenting a variant 503 of the advertisement, in the next ad pod.

In an exemplary operation, during a first ad pod, the ACR module 142 in the ACR-enabled connected TV device 141 may be operable to present, utilizing for example the ACR system 100, a polling overlay 501 related to the advertisement 502 associated with the sponsor 108 for viewer responses. The viewer interaction 302 with the polling overlay 501 for providing the viewer responses may be identified by the ACR module 142 in the ACR-enabled connected TV device 141, utilizing the ACR system 100. For example, the viewer 106 may respond to the polling questions provided in the polling overlay 501 via interaction with the polling overlay. In such instances, the ACR module 142 in the ACR-enabled connected TV device 141 may be operable to cause, utilizing the ACR system 100, presentation of the variant 503 of the advertisement associated with the sponsor 108 replacing the next occurrence of the original ad, based on one or more outcomes of the polling.

Figure 6:
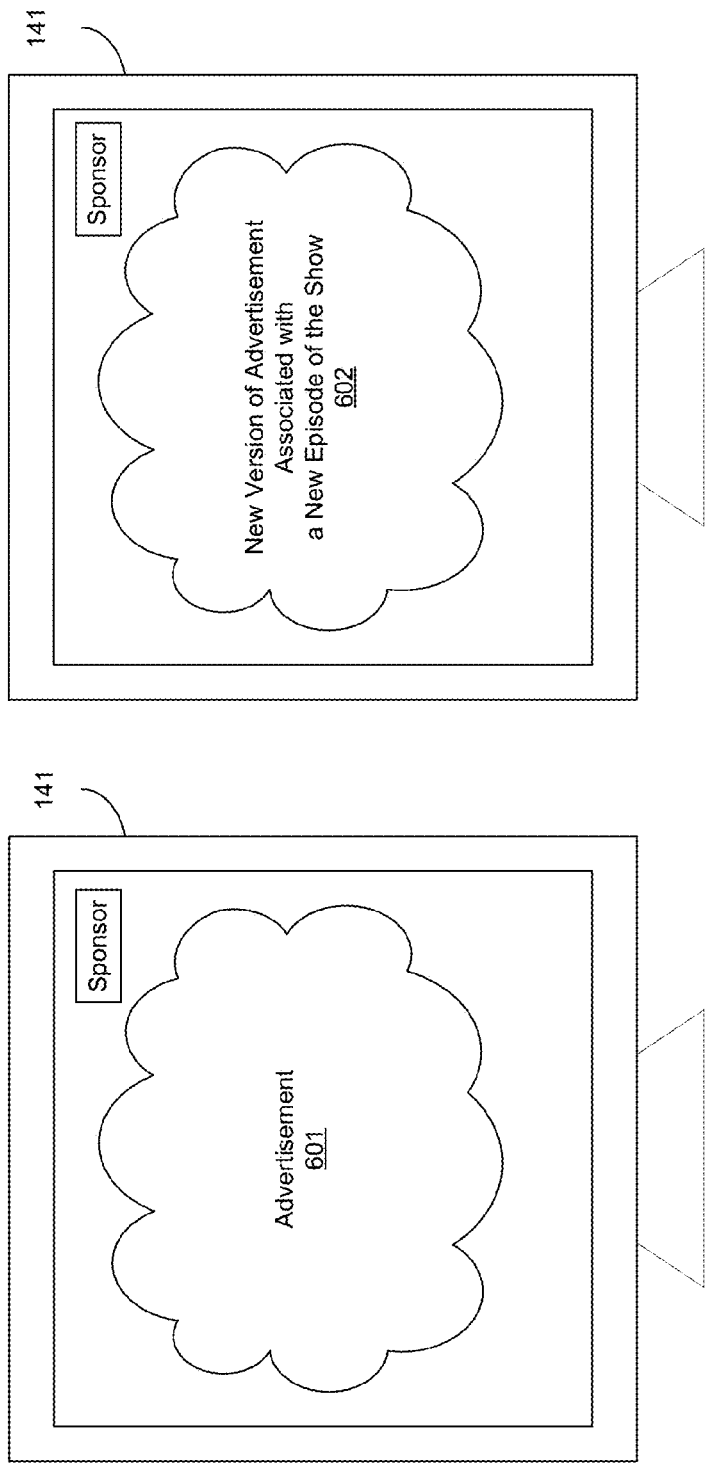
FIG. 6 is a block diagram illustrating an exemplary advertisement replacement associated with C3 rating, in accordance with an embodiment of the invention.

As an example, the sponsor 108 of the advertisement may comprise a pet supplies and services retailer. The polling overlay 501 may comprise a polling question asking what kind pets, such as dog, cat, goldfish, etc., that a viewer such as the viewer 106 may have. Based on the outcome of the polling, a customized ad featuring a dog, or a cat, or other pets may be presented replacing the next occurrence of the original ad. FIG. 6 is a block diagram illustrating an exemplary advertisement replacement associated with C3 rating, in accordance with an embodiment of the invention. Referring to FIG. 6, there is shown an ACR-enabled connected TV device 141 presenting an advertisement 601, during a live presentation of an episode of a show. The ACR-enabled connected TV device 141 is described with respect to FIG. 1A. The advertisement 601 may be associated with a sponsor such as the sponsor 108. The episode of the show may be recorded and stored in a DVR such as the DVR 109. There is also shown the ACR-enabled connected TV device 141 presenting a new version 602 of the advertisement, during a DVR playback of the stored episode of the show after C3 rating time window. The new version 602 of the advertisement may be associated with a new episode of the show, for example. In some embodiments of the invention, some or all ad pods may be replaced with those in the current episode of the show and the invention is not limited to just the new version of the old ad.

In an exemplary operation, the ACR module 142 in the ACR-enabled connected TV device 141 may be operable to identify or determine, utilizing for example the ACR system 100, that the episode of the show stored in the DVR 109 associated with the ACR-enabled connected TV device 141 has passed a C3 rating time window, and the advertisement 601 associated with the sponsor 108 was placed in a next ad pod in the episode during a live presentation of the episode of the show. In instances when the stored episode of the show is presented via a DVR playback after the C3 rating time window, the ACR module 142 in the ACR-enabled connected TV device 141 may be operable to cause, utilizing the ACR system 100, in, for example, the next ad pod, presentation of a new version 602 of the advertisement associated with the sponsor 108, based on the identification. In some embodiments of the invention, some or all ad pods may be replaced with those in the current episode of the show. The new version 602 of the advertisement may be associated with a new episode of the show, and presentation of the new version 602 of the advertisement may result in a C3 rating credit for the show.

Figure 7:
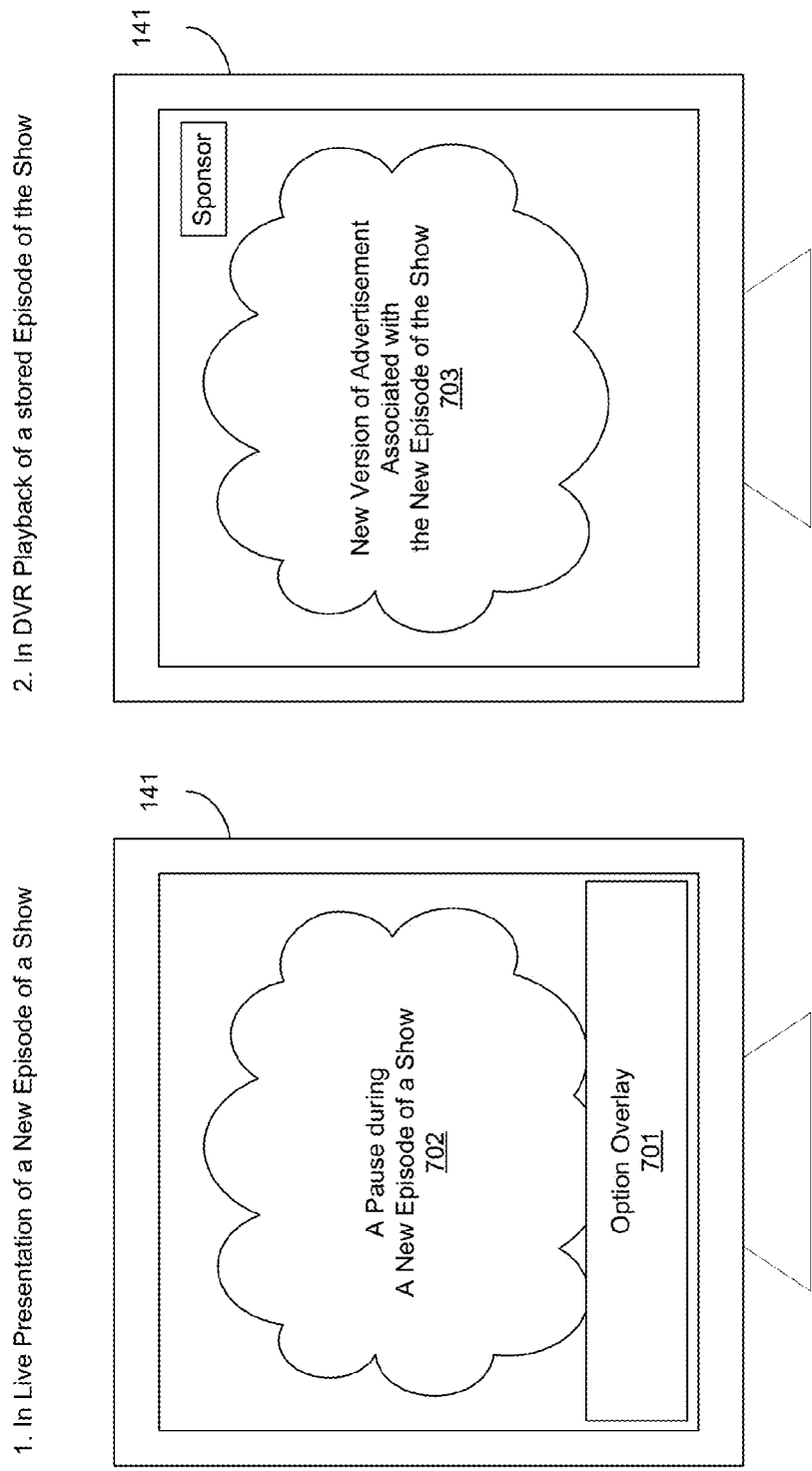
FIG. 7 is a block diagram illustrating an exemplary advertisement replacement associated with C3 rating, in accordance with an embodiment of the invention.

FIG. 7 is a block diagram illustrating an exemplary advertisement replacement associated with C3 rating, in accordance with an embodiment of the invention. Referring to FIG. 7, there is shown an ACR-enabled connected TV device 141 presenting an option overlay 701 and a pause 702, during a live presentation of a new episode of a show. The ACR-enabled connected TV device 141 is described with respect to FIG. 1A. There is also shown the ACR-enabled connected TV device 141 presenting a new version 703 of an advertisement, during a DVR playback of a stored episode of the show. The advertisement may be associated with the stored episode of the show and the new version 703 of the advertisement may be associated with the new episode of the show.

In an exemplary operation, the ACR module 142 in the ACR-enabled connected TV device 141 may be operable to identify or determine, utilizing for example the ACR system 100, that an episode of a show stored in the DVR 109 associated with the ACR-enabled connected TV device 141 has passed a C3 rating time window, the episode stored in the DVR 109 has not been played back for viewing, and the advertisement associated with the sponsor 108 was placed in, for example, a next ad pod for that sponsor in the stored episode. During presentation of a new episode of the show, the ACR module 142 in the ACR-enabled connected TV device 141 may be operable to detect, utilizing the ACR system 100, a pause 702 during the presentation of the new episode, where a new version 703 of the advertisement may be associated with the new episode, and presentation of the new version of the advertisement may result in a C3 rating credit for the show.

Based on the identification and the detection, the ACR module 142 in the ACR-enabled connected TV device 141 may be operable to present, utilizing the ACR system 100, an option overlay 701 offering viewing of the episode stored in the DVR 109 via a DVR playback. The viewer interaction 302 with the option overlay 701 for choosing viewing of the stored episode may then be identified by the ACR module 142 in the ACR-enabled connected TV device 141, utilizing the ACR system 100. In this regard, for example, in addition to offering viewing of the stored episode via the DVR playback, the option overlay 701 may also offer restarting of the paused new episode from the beginning. The viewer 106 may choose to view the episode stored in the DVR 109 via interaction with the option overlay 701. In instances when the stored episode of the show is presented via the DVR playback based on the identified viewer interaction 302, the ACR module 142 in the ACR-enabled connected TV device 141 may be operable to cause, utilizing the ACR system 100, in the next ad pod, presentation of the new version 703 of the advertisement associated with the sponsor 108. In such instances, the presentation of the new version 703 of the advertisement may result in the C3 rating credit for the show, and the new episode may be recorded and stored in the DVR 109 for later viewing.

Figure 8:
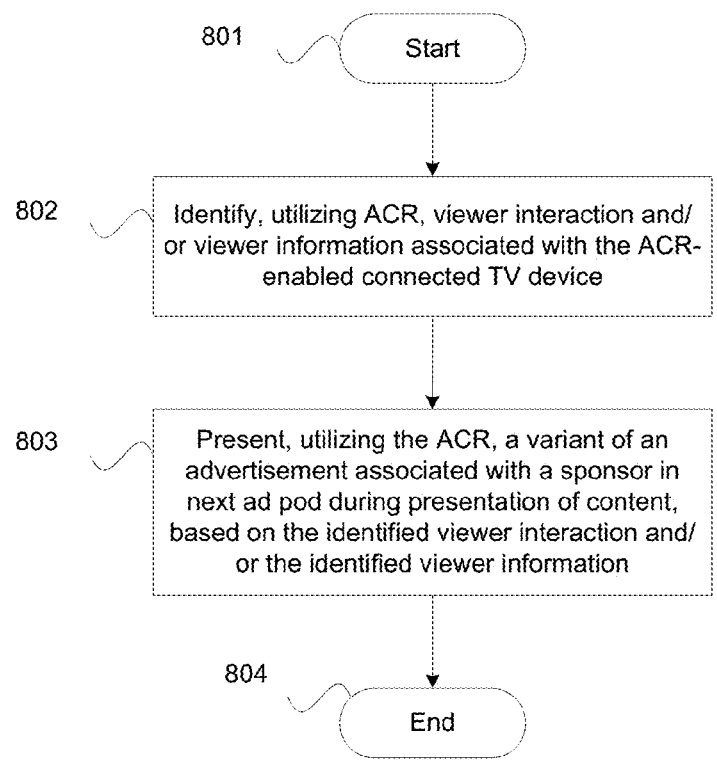
FIG. 8 is a flow chart illustrating exemplary steps for contextual advertisement replacement utilizing automatic content recognition, in accordance with an embodiment of the invention.

FIG. 8 is a flow chart illustrating exemplary steps for contextual advertisement replacement utilizing automatic content recognition, in accordance with an embodiment of the invention. Referring to FIG. 8, the exemplary steps start at step 801. In step 802, the ACR module 142 in the ACR-enabled connected TV device 141 may be operable to identify, utilizing ACR, for example utilizing the ACR system 100, viewer interaction 302 and/or viewer information 303 associated with the ACR-enabled connected TV device 141. In step 803, the ACR module 142 in the ACR-enabled connected TV device 141 may be operable to cause, utilizing the ACR, presentation of a variant 301 of an advertisement associated with a sponsor such as the sponsor 108 in a next ad pod or commercial break during presentation of content, based on the identified viewer interaction 302 and/or the identified viewer information 303. In this regard, in instances when the ACR-enabled connected TV device 141 is paired with or associated with the paired device 143 utilizing the companion application 144 downloaded in and running on the paired device 143, the variant 301 of the advertisement may also be presented on the paired device 143. The exemplary steps may proceed to the end step 804.

In various embodiments of the invention, an ACR module 142 in an ACR-enabled connected TV device 141 may be operable to identify, utilizing ACR, for example utilizing the ACR system 100, viewer interaction 302 and/or viewer information 303 associated with the ACR-enabled connected TV device 141. The ACR module 142 in the ACR-enabled connected TV device 141 may be operable to cause, utilizing the ACR, presentation of a variant 301 of an advertisement associated with a sponsor such as the sponsor 108 in a next ad pod or commercial break during presentation of content, based on the identified viewer interaction 302 and/or the identified viewer information 303. In instances when the ACR-enabled connected TV device 141 is paired with or associated with a paired device such as the paired device 143 utilizing the companion application 144 downloaded in and running on the paired device 143, the variant 301 of the advertisement may also be presented on the paired device 143.

In an exemplary embodiment of the invention, the ACR module 142 in the ACR-enabled connected TV device 141 may be operable to detect, utilizing the ACR, a particular scene 403 in the presented content or in an ad spot associated with the sponsor 108. Based on the detection, a selection overlay 401 for viewer selection of the variant 301 of the advertisement in the next ad pod may be presented by the ACR module 142 in the ACR-enabled connected TV device 141, utilizing the ACR. The viewer interaction 302 with the selection overlay 401 for selecting the variant 301 of the advertisement may be identified by the ACR module 142 in the ACR-enabled connected TV device 141, utilizing the ACR. For example, a viewer such as the viewer 106 may interact with the selection overlay 401 for selecting the variant 301 of the advertisement placed in the next ad pod. The ACR module 142 in the ACR-enabled connected TV device 141 may be operable to present, utilizing the ACR, a confirmation overlay 404 which may confirm the selection of the variant 301 of the advertisement. An information overlay 405 may be presented by the ACR module 142 in the ACR-enabled connected TV device 141 before the next ad pod, utilizing the ACR. The information overlay 405 may indicate that the variant 301 of the advertisement is to be presented in the next ad pod. In such instances, the ACR module 142 in the ACR-enabled connected TV device 141 may be operable to cause, based on the viewer selection, utilizing the ACR, presentation of the selected variant 406 of the advertisement associated with the sponsor 108 in the next ad pod.

In an exemplary embodiment of the invention, during a first ad pod, the ACR module 142 in the ACR-enabled connected TV device 141 may be operable to present, a polling overlay 501 related to the advertisement associated with the sponsor 108 for viewer responses. The viewer interaction 302 with the polling overlay 501 for providing the viewer responses may be identified by the ACR module 142 in the ACR-enabled connected TV device 141, utilizing the ACR. For example, the viewer 106 may respond to the polling questions provided in the polling overlay 501 via interaction with the polling overlay 501. In such instances, the ACR module 142 in the ACR-enabled connected TV device 141 may be operable to cause, based on one or more outcomes of the polling, utilizing the ACR, presentation of the variant 503 of the advertisement associated with the sponsor 108 in the next ad pod.

In some embodiments of the invention, the viewer information 303 may comprise customized preferences profile or default preferences setting(s) associated with the ACR-enabled connected TV device 141. The viewer information 303 may comprise, for example, viewing habits, time of day and/or location associated with the ACR-enabled connected TV device 141. The viewer information 303 may also comprise, for example, objects and/or events captured by a camera such as the camera 145 in or associated with the ACR-enabled connected TV device 141 and/or a camera such as the camera 146 in or associated with the paired device 143.

In an exemplary embodiment of the invention, the ACR module 142 in the ACR-enabled connected TV device 141 may be operable to identify or determine, utilizing the ACR, that an episode of a show stored in the DVR 109 associated with the ACR-enabled connected TV device 141 has passed a C3 rating time window, and the advertisement 601 associated with the sponsor 108 was placed in the next ad pod in the episode. In instances when the stored episode of the show is presented via a DVR playback after the C3 rating time window, the ACR module 142 in the ACR-enabled connected TV device 141 may be operable to cause, utilizing the ACR, in the next ad pod, presentation of a new version 602 of the advertisement associated with the sponsor 108, based on the identification, where the new version 602 of the advertisement may be associated with a new episode of the show, and presentation of the new version 602 of the advertisement may result in a C3 rating credit for the show.

In another exemplary embodiment of the invention, the ACR module 142 in the ACR-enabled connected TV device 141 may be operable to identify or determine, utilizing the ACR, that an episode of a show stored in the DVR 109 associated with the ACR-enabled connected TV device 141 has passed a C3 rating time window, the episode stored in the DVR 109 has not been played back for viewing, and the advertisement associated with the sponsor 108 was placed in the next ad pod in the stored episode. During presentation of a new episode of the show, the ACR module 142 in the ACR-enabled connected TV device 141 may be operable to detect, utilizing the ACR, a pause 702 during the presentation of the new episode, where a new version 703 of the advertisement may be associated with the new episode, and presentation of the new version 703 of the advertisement may result in a C3 rating credit for the show.

Based on the identification and the detection, the ACR module 142 in the ACR-enabled connected TV device 141 may be operable to present, utilizing the ACR, an option overlay 701 offering viewing of the episode stored in the DVR 109 via a DVR playback. The viewer interaction 302 with the option overlay 701 for choosing viewing of the stored episode may then be identified by the ACR module 142 in the ACR-enabled connected TV device 141, utilizing the ACR. In instances when the stored episode of the show is presented via the DVR playback based on the identified viewer interaction 302, the ACR mpgodule 142 in the ACR-enabled connected TV device 141 may be operable to cause, utilizing the ACR, in the next ad pod, presentation of the new version 703 of the advertisement associated with the sponsor 108. In such instances, the presentation of the new version 703 of the advertisement may result in the C3 rating credit for the show, and the new episode may be recorded and stored in the DVR 109 for later viewing.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for contextual advertisement replacement utilizing automatic content recognition.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in an automatic content recognition (ACR)-enabled connected TV device, wherein:
      said ACR-enabled connected TV device comprises an ACR module that communicates with an ACR system that is external to said automatic content recognition ACR-enabled connected TV device;
      said ACR module providing fingerprints to said ACR system for matching; and
      said ACR module receiving information and/or content from the ACR system based on said matching:
         identifying by said ACR module, utilizing ACR, viewer interaction and/or viewer information associated with said ACR-enabled connected TV device;
         presenting by said ACR module, utilizing said ACR, based on said identified viewer interaction and/or said identified viewer information, a variant of an advertisement associated with a sponsor in a next ad pod during presentation of content, and when said ACR-enabled connected TV device is paired with a paired device utilizing a companion application running on said paired device, said variant of said advertisement is also presented on said paired device;

identifying by said ACR module, utilizing said ACR, that an episode of a show stored in a DVR associated with said ACR-enabled connected TV device has passed a C3 rating time window, said episode stored in said DVR has not been played back for viewing, and said advertisement associated with said sponsor was placed in said next ad pod in said episode;

detecting by said ACR module, utilizing said ACR, a pause during presentation of a new episode of said show, wherein a new version of said advertisement is associated with said new episode, and presentation of said new version of said advertisement results in a C3 rating credit for said show;

presenting by said ACR module, utilizing said ACR, an option overlay offering viewing of said episode stored in said DVR via a DVR playback, based on said identification and said detection;

identifying by said ACR module, utilizing said ACR, said viewer interaction with said option overlay for choosing viewing of said stored episode; and when said stored episode of said show is presented via said DVR playback based on said identified viewer interaction, presenting by said ACR module, utilizing said ACR, in said next ad pod said new version of said advertisement associated with said sponsor, wherein said presentation of said new version of said advertisement results in said C3 rating credit for said show, and said new episode is recorded in said DVR for later viewing.

2. The method according to claim 1, comprising:

detecting by said ACR module, utilizing said ACR, a particular scene in said presented content or in an ad spot associated with said sponsor;

presenting by said ACR module, utilizing said ACR, based on said detection, a selection overlay for viewer selection of said variant of said advertisement in said next ad pod;

Identifying by said ACR module, utilizing said ACR, said viewer interaction with said selection overlay for selecting said variant of said advertisement;

presenting by said ACR module, utilizing said ACR, a confirmation overlay which confirms said selection of said variant of said advertisement;

presenting by said ACR module, utilizing said ACR, an information overlay before said next ad pod, said information overlay indicates that said variant of said advertisement is to be presented in said next ad pod; and presenting by said ACR module, utilizing said ACR, based on said viewer selection, said selected variant of said advertisement associated with said sponsor in said next ad pod.

3. The method according to claim 1, comprising:

during a first ad pod, presenting by said ACR module, utilizing said ACR, a polling overlay related to said advertisement associated with said sponsor for viewer responses;

identifying by said ACR module, utilizing said ACR, said viewer interaction with said polling overlay for providing said viewer responses; and presenting by said ACR module, based on one or more outcomes of said polling, utilizing said ACR, said variant of said advertisement associated with said sponsor in said next ad pod.

4. The method according to claim 1, wherein said viewer information comprises customized preferences profile or default preferences setting associated with said ACR-enabled connected TV device.

5. The method according to claim 1, wherein said viewer information comprises viewing habits associated with said ACR-enabled connected TV device.

6. The method according to claim 1, wherein said viewer information comprises time of day associated with said ACR-enabled connected TV device.

7. The method according to claim 1, wherein said viewer information comprises location associated with said ACR-enabled connected TV device.

8. The method according to claim 1, wherein said viewer information comprises objects and/or events captured by a camera in or associated with said ACR-enabled connected TV device and/or a camera in or associated with said paired device.

9. The method according to claim 1, comprising:

identifying, utilizing said ACR, that an episode of a second show stored in said DVR associated with said ACR-enabled connected TV device has passed a second C3 rating time window, and said advertisement associated with said sponsor was placed in said next ad pod in said episode; and when said stored episode of said second show is presented via said DVR playback after said second C3 rating time window, presenting based on said identification, utilizing said ACR, in said next ad pod a new version of said second advertisement associated with said sponsor, wherein said new version of said second advertisement is associated with a new episode of said second show, and said presentation of said new version of said second advertisement results in a second C3 rating credit for said second show.

10. A system, comprising:

an automatic content recognition (ACR)-enabled connected TV device, wherein:

said ACR-enabled connected TV device comprises an ACR module that communicates with an ACR system that is external to said automatic content recognition ACR-enabled connected TV device;

said ACR module provides fingerprints to said ACR system for matching;

said ACR module receives information and/or content from the ACR system based on said matching:

said ACR-enabled connected TV device is operable to:

identify by said ACR module, utilizing ACR, viewer interaction and/or viewer information associated with said ACR-enabled connected TV device;

present by said ACR module, utilizing said ACR, based on said identified viewer interaction and/or said identified viewer information, a variant of an advertisement associated with a sponsor in a next ad pod during presentation of content, and when said ACR-enabled connected TV device is paired with a paired device utilizing a companion application that runs on said paired device, said variant of said advertisement is also presented on said paired device;

identify by said ACR module, utilizing said ACR, that an episode of a show stored in a DVR associated with said ACR-enabled connected TV device has passed a C3 rating time window, said episode stored in said DVR has not been played back for viewing, and said advertisement associated with said sponsor was placed in said next ad pod in said episode;

detect by said ACR module, utilizing said ACR, a pause during presentation of a new episode of said show, and a new version of said advertisement is associated with said new episode, and presentation of said new version of said advertisement results in a C3 rating credit for said show;

present by said ACR module, utilizing said ACR, an option overlay that offers viewing of said episode stored in said DVR via a DVR playback, based on said identification and said detection;

identify by said ACR module, utilizing said ACR, said viewer interaction with said option overlay to choose viewing of said stored episode; and when said stored episode of said show is presented via said DVR playback based on said identified viewer interaction, present by said ACR module, utilizing said ACR, in said next ad pod said new version of said advertisement associated with said sponsor, wherein said presentation of said new version of said advertisement results in said C3 rating credit for said show, and said new episode is recorded in said DVR for later viewing.

11. The system according to claim 10, wherein said ACR-enabled connected TV device is operable to:

detect by said ACR module, utilizing said ACR, a particular scene in said presented content or in an ad spot associated with said sponsor;

present by said ACR module, utilizing said ACR, based on said detection, a selection overlay for viewer selection of said variant of said advertisement in said next ad pod;

Identify by said ACR module, utilizing said ACR, said viewer interaction with said selection overlay to select said variant of said advertisement;

present by said ACR module, utilizing said ACR, a confirmation overlay which confirms said selection of said variant of said advertisement;

present by said ACR module, utilizing said ACR, an information overlay before said next ad pod, said information overlay indicates that said variant of said advertisement is to be presented in said next ad pod; and present by said ACR module, utilizing said ACR, based on said viewer selection, said selected variant of said advertisement associated with said sponsor in said next ad pod.

12. The system according to claim 10, wherein said ACR-enabled connected TV device is operable to:

during a first ad pod, present by said ACR module, utilizing said ACR, a polling overlay related to said advertisement associated with said sponsor for viewer responses;

identify, utilizing said ACR by said ACR module, said viewer interaction with said polling overlay to provide said viewer responses; and present by said ACR module, based on one or more outcomes of said polling, utilizing said ACR, said variant of said advertisement associated with said sponsor in said next ad pod.

13. The system according to claim 10, wherein said viewer information comprises customized preferences profile or default preferences setting associated with said ACR-enabled connected TV device.

14. The system according to claim 10, wherein said viewer information comprises viewing habits associated with said ACR-enabled connected TV device.

15. The system according to claim 10, wherein said viewer information comprises time of day associated with said ACR-enabled connected TV device.

16. The system according to claim 10, wherein said viewer information comprises location associated with said ACR-enabled connected TV device.

17. The system according to claim 10, wherein said viewer information comprises objects and/or events captured by a camera in or associated with said ACR-enabled connected TV device and/or a camera in or associated with said paired device.

18. The system according to claim 10, wherein said ACR-enabled connected TV device is operable to:

identify, by said ACR, that an episode of a second show stored in said DVR associated with said ACR-enabled connected TV device has passed a second C3 rating time window, and said advertisement associated with said sponsor was placed in said next ad pod in said episode; and when said stored episode of said second show is presented via said DVR playback after said second C3 rating time window, present based on said identification, by said ACR, in said next ad pod a new version of said second advertisement associated with said sponsor, wherein said new version of said second advertisement is associated with a new episode of said second show, and said presentation of said new version of said second advertisement results in a second C3 rating credit for said second show.

19. A non-transitory computer-readable medium having stored thereon, a computer program having at least one code section for processing data in a data processing system, the at least one code section being executable by a computer to cause the computer to execute operations, comprising:

in an automatic content recognition (ACR)-enabled connected TV device, wherein:

said ACR-enabled connected TV device comprises an ACR module that communicates with an ACR system that is external to said automatic content recognition ACR-enabled connected TV device;

said ACR module providing fingerprints to said ACR system for matching; and said ACR module receiving information and/or content from the ACR system based on said matching:

identifying by said ACR module, utilizing ACR, viewer interaction and/or viewer information associated with said ACR-enabled connected TV device;

presenting by said ACR module, utilizing said ACR, based on said identified viewer interaction and/or said identified viewer information, a variant of an advertisement associated with a sponsor in a next ad pod during presentation of content, and when said ACR-enabled connected TV device is paired with a paired device utilizing a companion application running on said paired device, said variant of said advertisement is also presented on said paired device;

identifying by said ACR module, utilizing said ACR, that an episode of a show stored in a DVR associated with said ACR-enabled connected TV device has passed a C3 rating time window, said episode stored in said DVR has not been played back for viewing, and said advertisement associated with said sponsor was placed in said next ad pod in said episode;

detecting by said ACR module, utilizing said ACR, a pause during presentation of a new episode of said show, wherein a new version of said advertisement is associated with said new episode, and presentation of said new version of said advertisement results in a C3 rating credit for said show;

presenting by said ACR module, utilizing said ACR, an option overlay offering viewing of said episode stored in said DVR via a DVR playback, based on said identification and said detection;

identifying by said ACR module, utilizing said ACR, said viewer interaction with said option overlay for choosing viewing of said stored episode; and when said stored episode of said show is presented via said DVR playback based on said identified viewer interaction, presenting by said ACR module, utilizing said ACR, in said next ad pod said new version of said advertisement associated with said sponsor, wherein said presentation of said new version of said advertisement results in said C3 rating credit for said show, and said new episode is recorded in said DVR for later viewing.

20. The non-transitory computer-readable medium according to claim 19, the at least one code section being executable by the computer to cause the computer to execute operations, comprising:

detecting by said ACR module, utilizing said ACR, a particular scene in said presented content or in an ad spot associated with said sponsor;

presenting by said ACR module, utilizing said ACR, based on said detection, a selection overlay for viewer selection of said variant of said advertisement in said next ad pod;

Identifying by said ACR module, utilizing said ACR, said viewer interaction with said selection overlay for selecting said variant of said advertisement;

presenting by said ACR module, utilizing said ACR, a confirmation overlay which confirms said selection of said variant of said advertisement;

presenting by said ACR module, utilizing said ACR, an information overlay before said next ad pod, said information overlay indicates that said variant of said advertisement is to be presented in said next ad pod; and presenting by said ACR module, utilizing said ACR, based on said viewer selection, said selected variant of said advertisement associated with said sponsor in said next ad pod.

* * * * *